United States Patent
Nam et al.

(10) Patent No.: US 12,047,875 B2
(45) Date of Patent: *Jul. 23, 2024

(54) APPLICATION DELAY FOR POWER MODE ADAPTATION

(71) Applicant: QUALCOMM Incorporated, San Diego, CA (US)

(72) Inventors: Wooseok Nam, San Diego, CA (US); Tao Luo, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 18/168,334

(22) Filed: Feb. 13, 2023

(65) Prior Publication Data

US 2023/0319710 A1 Oct. 5, 2023

Related U.S. Application Data

(63) Continuation of application No. 16/951,952, filed on Nov. 18, 2020, now Pat. No. 11,606,749.

(Continued)

(51) Int. Cl.
*H04W 52/02* (2009.01)
*H04W 72/12* (2023.01)

(52) U.S. Cl.
CPC ....... *H04W 52/0212* (2013.01); *H04W 72/12* (2013.01)

(58) Field of Classification Search
CPC ......... H04W 52/0212; H04W 52/0216; H04W 52/0258; H04W 72/1205; Y02D 30/70
See application file for complete search history.

(56) References Cited

U.S. PATENT DOCUMENTS 9,756,594 B2 9/2017 Loehr et al.
10,505,685 B2 12/2019 Akkarakaran et al.
(Continued)

FOREIGN PATENT DOCUMENTS

WO WO-2018039519 A1 3/2018

OTHER PUBLICATIONS

CATT: "Power Saving Scheme with Cross-Slot Scheduling", 3GPP Draft, 3GPP TSG RAN WG1 Meeting #98, R1-1908606, vol. RAN WG1, No. Prague, CZ, Aug. 17, 2019 (Aug. 17, 2019), XP051765214, 5 Pages, Retrieved from the Internet: URL: http://www.3gpp.org/ftp/tsg_ran/WG1_RL1/TSGR1_98/Docs/R1-1908606.zip. the whoTe document.

(Continued)

*Primary Examiner* — Liton Miah
(74) *Attorney, Agent, or Firm* — Holland & Hart LLP

(57) ABSTRACT

Methods, systems, and devices for wireless communications are described. A user equipment (UE) may communicate with a base station on multiple component carriers (CCs) in a carrier aggregation (CA) configuration. The base station may transmit an indication to the UE that identifies a new power mode (e.g., a power mode adjustment) that the UE is to implement. The power mode may identify communication parameters that the UE is to adjust. The UE may determine a delay for applying the new power mode on the CCs. The delay may provide the UE time to activate or deactivate components or elements based on the new power mode. In some examples, the UE may determine the delay based on one or more selected CCs and then apply the delay across the CCs. The UE may implement the power mode on one or more (or all) of the CCs following the delay.

30 Claims, 16 Drawing Sheets

Related U.S. Application Data

(60) Provisional application No. 62/937,647, filed on Nov. 19, 2019.

(56) References Cited

U.S. PATENT DOCUMENTS

| | | | |
|---|---|---|---|
| 11,606,749 B2* | 3/2023 | Nam | H04W 52/0258 |
| 2012/0008600 A1* | 1/2012 | Marinier | H04W 74/0833 |
| | | | 370/336 |
| 2012/0182874 A1* | 7/2012 | Siomina | H04W 56/004 |
| | | | 370/241 |
| 2013/0142113 A1 | 6/2013 | Fong et al. | |
| 2013/0250925 A1* | 9/2013 | Lohr | H04W 36/30 |
| | | | 370/336 |
| 2014/0029586 A1* | 1/2014 | Loehr | H04L 5/0055 |
| | | | 370/336 |
| 2016/0227505 A1* | 8/2016 | Loehr | H04L 69/323 |
| 2019/0110254 A1 | 4/2019 | Yerramalli et al. | |
| 2020/0323026 A1 | 10/2020 | Kim et al. | |
| 2020/0351777 A1 | 11/2020 | Kim et al. | |
| 2021/0153117 A1 | 5/2021 | Nam et al. | |

OTHER PUBLICATIONS

Ericsson: "Summary #1 of Efficient and Low Latency Serving Cell Configuration/Activation/Setup", 3GPP Draft, 3GPP TSG RAN WG1 Meeting #98bis, R1-1911349, Fast_Scell_Summary_VO, vol. RAN WG1, No. Chongqing, China, Oct. 22, 2019 (Oct. 22, 2019), XP051798629, 17 Pages, Retrieved from the Internet: URL: https://ftp.3gpp.org/tsg_ran/WG1_RL1/TSGR1_98b/Docs/R1-1911349.zip. p. 4-p. 6 p. 9-p. 10 p. 11-p. 14.
International Preliminary Report on Patentability—PCT/US2020/061193 The International Bureau of WIPO—Geneva, Switzerland, Jun. 2, 2022.
International Search Report and Written Opinion—PCT/US2020/061193—ISA/EPO—Feb. 19, 2021.
Qualcomm Incorporated: "Cross-Slot Scheduling Power Saving Techniques", 3GPP Draft, 3GPP TSG-RAN WG1 #97, R1-1907295 Cross-Slot Scheduling Power Saving Techniques, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728735, 16 Pages, p. 1 p. 3 p. 6 p. 11, paragraph [0001]- paragraph [0002].
Samsung: "On PDCCH-Based Power Saving Signal/Channel", 3GPP Draft, 3GPP TSG RAN WG1 RAN1 Meeting #96bis, R1-1904461, vol. RAN WG1, No. Xian, China, Apr. 3, 2019 (Apr. 3, 2019), XP051707225, 7 Pages, Retrieved from the Internet: URL: http://www.3gpp.org/ftp/tsg%5Fran/WG1%5FRL1/TSGR1%5F96b/Docs/R1%2D1904461%2Ezip. p. 2-p. 6.
Samsung: "On SCell Activation and Dormant Cells", 3GPP TSG RAN WG1 #98bis, R1-1910508, Chongqing, China, Oct. 14-20, 2019, pp. 1-3.
Catt: "Triggering of SCell Dormancy", 3GPP TSG RAN WG1 Meeting #98bis, R1-1910325, Chongqing, China, Oct. 14-20, 2019, pp. 1-5.
Ericsson: "Reduced Latency Seen Management for NR CA", 3GPP TSG-RAN WG1 #98bis, R1-1911015, Oct. 20, 2019 (Oct. 20, 2019), 9 Pages, sections 1, 2.2, 5.
Huawei., et al., "Discussion on SCell Activation and Deactivation", 3GPP TSG RAN WG1 Meeting #98, R1-1908099, Prague, Czech Republic, Aug. 26-30, 2019, 17 Pages.
Mediatek Inc: "Efficient and Low Latency SCell Data Transmission for NR CA", 3GPP TSG RAN WG1 Meeting RAN1 #98-Bis, R1-1911062, Efficient and Low Latency Scell Data Transmission for Nr Ca_20191004_Final, 3rd Generation Partnership Project, Mobile Competence Centre, 650, Route Des Lucioles, F-06921, vol. RAN WG1, No. Chongqing, China, Oct. 14, 2019-Oct. 20, 2019, 19 Pages, Oct. 5, 2019, XP051789842, p. 7, paragraph 3, p. 15, paragraph 4, figures 3-9.
Qualcomm Incorporated: "Considerations on Physical Layer Aspects of NR V2X", 3GPP Draft, 3GPP TSG RAN WG1 Meeting #98, R1-1913493, R1-1912944, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 14, 20191114-Nov. 20, 2019, Nov. 25, 2019 (Nov. 25, 2019), XP051830771, 16 pages, sections 2.8, 2.9, 3.
Vivo: "Fast Scell Activation and Dormancy like Behavior," 3GPP Draft, 3GPP TSG RAN WG1 #98bis, R1-1910242, Oct. 14-20, 2019, pp. 1-11.

\* cited by examiner

APPLICATION DELAY FOR POWER MODE ADAPTATION

CROSS REFERENCE

The present Application for Patent is a continuation of U.S. Non-Provisional Ser. No. 16/951,952 by NAM et al., entitled "APPLICATION DELAY FOR POWER MODE ADAPTATION", filed Nov. 18, 2020, which claims the benefit of U.S. Provisional Patent Application No. 62/937,647 by NAM et al., entitled "APPLICATION DELAY FOR POWER MODE ADAPTATION," filed Nov. 19, 2019, assigned to the assignee hereof, and expressly incorporated by reference herein.

FIELD OF TECHNOLOGY

The following relates generally to wireless communications and more specifically to application delay for power mode adaptation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a base station on multiple component carriers (CCs) in a carrier aggregation (CA) configuration. In some examples, the base station may indicate that the UE is to implement a power saving mode. However, for some examples, other implementation techniques may be deficient.

SUMMARY

The described techniques relate to improved methods, systems, devices, and apparatuses that support application delay for power mode adaptation. Generally, the described techniques provide for enabling a device, such as a user equipment (UE), to determine a delay for applying a power mode across component carriers (CCs) (e.g., a common delay) in a carrier aggregation configuration. A base station may transmit an indication to a UE that identifies a new power mode that the UE is to implement for communications. The power mode may identify communication parameters the UE is to adjust, for example, to reduce power consumption. The UE may determine a delay for applying the new power mode on the CCs. In some examples, the delay may provide the UE with time to activate or deactivate components or elements based on the new power mode. In some examples, the UE may determine the delay based on one or more selected CCs and then apply the delay across the CCs. The UE may apply the power mode adjustment following the delay. Based on applying the power mode, the UE may increase communication efficiency and extend battery life, among other advantages.

A method of wireless communications at a user equipment is described. The method may include monitoring a set of component carriers in a carrier aggregation configuration, receiving, based on the monitoring, an indication of a power mode adaptation for the set of component carriers, determining a delay for applying the power mode adaptation to the set of component carriers, applying the power mode adaptation to the set of component carriers after the delay, and communicating, based on applying the power mode adaptation, with a base station on one or more component carriers of the set of component carriers.

An apparatus for wireless communications at a user equipment is described. The apparatus may include a processor, memory coupled with the processor, and instructions stored in the memory. The instructions may be executable by the processor to cause the apparatus to monitor a set of component carriers in a carrier aggregation configuration, receive, based on the monitoring, an indication of a power mode adaptation for the set of component carriers, determine a delay for applying the power mode adaptation to the set of component carriers, apply the power mode adaptation to the set of component carriers after the delay, and communicate, based on applying the power mode adaptation, with a base station on one or more component carriers of the set of component carriers.

Another apparatus for wireless communications at a user equipment is described. The apparatus may include means for monitoring a set of component carriers in a carrier aggregation configuration, receiving, based on the monitoring, an indication of a power mode adaptation for the set of component carriers, determining a delay for applying the power mode adaptation to the set of component carriers, applying the power mode adaptation to the set of component carriers after the delay, and communicating, based on applying the power mode adaptation, with a base station on one or more component carriers of the set of component carriers.

A non-transitory computer-readable medium storing code for wireless communications at a user equipment is described. The code may include instructions executable by a processor to monitor a set of component carriers in a carrier aggregation configuration, receive, based on the monitoring, an indication of a power mode adaptation for the set of component carriers, determine a delay for applying the power mode adaptation to the set of component carriers, apply the power mode adaptation to the set of component carriers after the delay, and communicate, based on applying the power mode adaptation, with a base station on one or more component carriers of the set of component carriers.

In some examples of the method, apparatuses, and non-transitory computer-readable medium described herein, applying the power mode adaptation may include operations, features, means, or instructions for adjusting, based on the indication of the power mode adaptation, a downlink scheduling offset, a physical downlink control channel monitoring periodicity, a quantity of downlink communication layers, or any combination thereof.

Some examples of the method, apparatuses, and non-transitory computer-readable medium described herein may further include operations, features, means, or instructions for determining a first quantity of slots associated with the delay for a first component carrier of the set of component carriers based on a first numerology associated with the first component carrier, determining a second quantity of slots associated with the delay for a second component carrier of the set of component carriers based on a second numerology associated with the second component carrier, communicating on the first component carrier based on applying the power mode adaptation after the first quantity of slots, and communicating on the second component carrier based on applying the power mode adaptation after the second quantity of slots.

In some examples of the method, apparatuses, and non-transitory computer-readable medium described herein, determining the delay may include operations, features, means, or instructions for determining the delay based on a processing time corresponding to one or more numerologies associated with one or more of the set of component carriers, a processing time corresponding to adjusting hardware components at the user equipment, a scheduling offset value associated with downlink transmissions, a current power mode for the set of component carriers, one or more numerologies associated with one or more of the set of component carriers, or any combination thereof.

Some examples of the method, apparatuses, and non-transitory computer-readable medium described herein may further include operations, features, means, or instructions for identifying a change in an activation status of one or more of the set of component carriers, updating the delay for applying the power mode adaptation based on identifying the change in the activation status, and applying the power mode adaptation to the set of component carriers after the updated delay.

In some examples of the method, apparatuses, and non-transitory computer-readable medium described herein, receiving the indication may include operations, features, means, or instructions for receiving the indication in downlink control information, radio resource control signaling, a medium access control control element, or any combination thereof.

In some examples of the method, apparatuses, and non-transitory computer-readable medium described herein, determining the delay may include operations, features, means, or instructions for selecting a component carrier of the set of component carriers, and determining the delay based on one or more parameters associated with the selected component carrier.

Some examples of the method, apparatuses, and non-transitory computer-readable medium described herein may further include operations, features, means, or instructions for receiving the indication of the power mode adaptation on the selected component carrier. In some examples of the method, apparatuses, and non-transitory computer-readable medium described herein, the selected component carrier includes an anchor component carrier or a master component carrier of the set of component carriers.

In some examples of the method, apparatuses, and non-transitory computer-readable medium described herein, the selected component carrier may have a highest index of the set of component carriers. In some examples of the method, apparatuses, and non-transitory computer-readable medium described herein, the selected component carrier may have a lowest index of the set of component carriers.

In some examples of the method, apparatuses, and non-transitory computer-readable medium described herein, the selected component carrier may have a largest subcarrier spacing of the set of component carriers. In some examples of the method, apparatuses, and non-transitory computer-readable medium described herein, the selected component carrier may have a smallest subcarrier spacing of the set of component carriers.

In some examples of the method, apparatuses, and non-transitory computer-readable medium described herein, determining the delay further may include operations, features, means, or instructions for determining, for each component carrier of the set of component carriers, a respective delay for applying the power mode adaptation to the set of component carriers based on the parameters. In some examples of the method, apparatuses, and non-transitory computer-readable medium described herein, the selected component carrier may have a smallest delay of the set of component carriers. In some examples of the method, apparatuses, and non-transitory computer-readable medium described herein, the selected component carrier may have a largest delay of the set of component carriers.

A method of wireless communications at a base station is described. The method may include transmitting, to a user equipment, an indication of a power mode adaptation for a set of component carriers in a carrier aggregation configuration, determining, based on transmitting the indication of the power mode adaptation, a delay for applying the power mode adaptation to the set of component carriers at the user equipment, and communicating, after the delay, with the user equipment on one or more component carriers of the set of component carriers based on the power mode adaptation.

An apparatus for wireless communications at a base station is described. The apparatus may include a processor, memory coupled with the processor, and instructions stored in the memory. The instructions may be executable by the processor to cause the apparatus to transmit, to a user equipment, an indication of a power mode adaptation for a set of component carriers in a carrier aggregation configuration, determine, based on transmitting the indication of the power mode adaptation, a delay for applying the power mode adaptation to the set of component carriers at the user equipment, and communicate, after the delay, with the user equipment on one or more component carriers of the set of component carriers based on the power mode adaptation.

Another apparatus for wireless communications at a base station is described. The apparatus may include means for transmitting, to a user equipment, an indication of a power mode adaptation for a set of component carriers in a carrier aggregation configuration, determining, based on transmitting the indication of the power mode adaptation, a delay for applying the power mode adaptation to the set of component carriers at the user equipment, and communicating, after the delay, with the user equipment on one or more component carriers of the set of component carriers based on the power mode adaptation.

A non-transitory computer-readable medium storing code for wireless communications at a base station is described. The code may include instructions executable by a processor to transmit, to a user equipment, an indication of a power mode adaptation for a set of component carriers in a carrier aggregation configuration, determine, based on transmitting the indication of the power mode adaptation, a delay for applying the power mode adaptation to the set of component carriers at the user equipment, and communicate, after the delay, with the user equipment on one or more component carriers of the set of component carriers based on the power mode adaptation.

Some examples of the method, apparatuses, and non-transitory computer-readable medium described herein may further include operations, features, means, or instructions for refraining from transmitting an indication of a second power mode adaptation for the set of component carriers during the delay.

Some examples of the method, apparatuses, and non-transitory computer-readable medium described herein may further include operations, features, means, or instructions for determining a first quantity of slots associated with the delay for a first component carrier of the set of component carriers based on a first numerology associated with the first component carrier, determining a second quantity of slots associated with the delay for a second component carrier of the set of component carriers based on a second numerology associated with the second component carrier, communicating on the first component carrier based on applying the power mode adaptation after the first quantity of slots, and communicating on the second component carrier based on applying the power mode adaptation after the second quantity of slots.

In some examples of the method, apparatuses, and non-transitory computer-readable medium described herein, determining the delay may include operations, features, means, or instructions for determining the delay based on a processing time at the user equipment corresponding to one or more numerologies associated with one or more of the set of component carriers, a processing time corresponding to adjusting hardware components at the user equipment, a scheduling offset value associated with downlink transmissions, a current power mode at the user equipment for the set of component carriers, one or more numerologies associated with one or more of the set of component carriers, or any combination thereof.

Some examples of the method, apparatuses, and non-transitory computer-readable medium described herein may further include operations, features, means, or instructions for identifying a change in an activation status of one or more of the set of component carriers, updating the delay for applying the power mode adaptation based on identifying the change in the activation status, and communicating, after the updated delay, with the user equipment on one or more component carriers of the set of component carriers based on the power mode adaptation.

In some examples of the method, apparatuses, and non-transitory computer-readable medium described herein, transmitting the indication may include operations, features, means, or instructions for transmitting the indication in downlink control information, radio resource control signaling, a medium access control control element, or any combination thereof.

In some examples of the method, apparatuses, and non-transitory computer-readable medium described herein, determining the delay may include operations, features, means, or instructions for identifying a selected component carrier of the set of component carriers, and determining the delay based on one or more parameters associated with the selected component carrier.

Some examples of the method, apparatuses, and non-transitory computer-readable medium described herein may further include operations, features, means, or instructions for transmitting the indication of the power mode adaptation on the selected component carrier.

DETAILED DESCRIPTION

Figure 1:
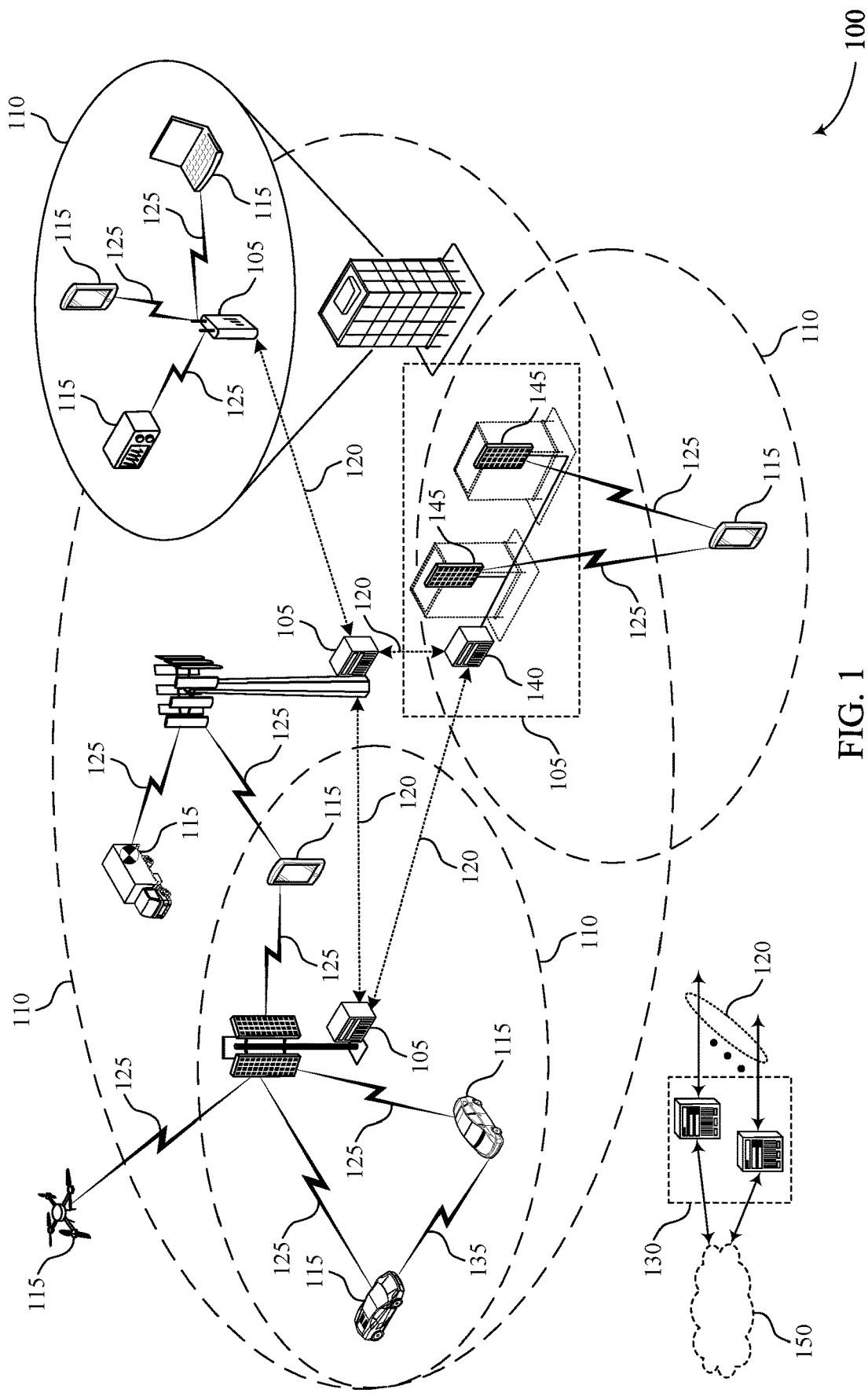
FIGS. 1 and 2 illustrate examples of a wireless communications system that supports application delay for power mode adaptation in accordance with aspects of the present disclosure.

A user equipment (UE) in a wireless communications system may communicate with one or more network nodes such as base stations. In some examples, a UE may exchange signaling with a base station on multiple component carriers (CCs) in a carrier aggregation (CA) configuration to increase available bandwidth and data rates for the UE, among other advantages. The CA configuration may include intra-band CA, where the UE may communicate on one or more CCs in the same frequency band, along with other examples. The CCs may be contiguous in frequency or non-contiguous in some examples. Communications on the CCs at the UE may include monitoring for physical downlink control channel (PDCCH) transmissions, receiving physical downlink shared channel (PDSCH) transmissions, transmitting physical uplink control channel (PUCCH) and physical uplink shared channel (PUSCH) transmissions, measuring channels, etc.

A UE may implement power-saving techniques to increase communication efficiency and extend battery life, among other advantages. For example, a UE may adapt one or more communication parameters based on receiving an indication such as from a base station. The indication from may identify a power mode.

In some examples, if different power modes are indicated for different CCs, an overall potential power savings may be reduced. For example, a UE may use the same hardware components (e.g., antennas, a transceiver, etc.) across multiple CCs in intra-band CA. A first CC may operate according to a first power mode, which may indicate a maximum of four active multiple-input multiple-output (MIMO) layers. Concurrently, a second CC may operate according to a second power mode, which may indicate a maximum of two active MIMO layers. The UE may keep hardware components active to support the four MIMO layers indicated in the first power mode, which may unnecessarily dilute the power savings of the second power mode. It may therefore be beneficial to adopt a common (e.g., joint) power mode across CCs in the CA configuration to efficiently reduce power consumption.

A new power mode may be applied for communications between the base station and the UE after a time delay, which may be referred to as an application delay. A duration of the delay may be based on a numerology, a current power mode in use at the UE, or one or more other factors or conditions, or any combination thereof. In some examples, the delay for applying a common power mode may be different for different CCs in the CA configuration. Differences in delays may reduce overall power savings.

According to the techniques described herein, a UE may determine a common delay for applying a common power mode across a quantity of CCs in a CA configuration. The UE may identify the power mode based on an indication from a base station. In some examples, the UE may select a CC to facilitate determining the common delay. The selected CC may be an anchor CC or a master CC for the CCs in the CA configuration. Additionally or alternatively, the UE may select the CC based on an index associated with the CC, a subcarrier spacing of the CC, a determined delay associated with the CC, or an indication from the base station, or one or more other factors, or any combination thereof.

In some examples, different CCs may have different associated numerologies. The UE may use a numerology conversion before applying the delay, for example, to ensure that the new power mode is applied concurrently on all CCs. The selected CC for determining the delay may have a subcarrier spacing with an associated numerology parameter $\mu_{source}$ such that the subcarrier spacing of the selected CC may be $15 \cdot 2^{\mu_{source}}$ kilohertz (kHz), and the delay in slots on the selected CC may be represented by the term $D_{source}$. Another CC may have a different subcarrier spacing with an associated numerology parameter $\mu_{target}$ such that the subcarrier spacing of the other CC may be $15 \cdot 2^{\mu_{target}}$ kHz. The UE may use the numerology conversion to determine the delay in slots $D_{target}$ on the other CC based on the equation $$D_{target} = \left\lceil D_{source} \cdot \frac{2^{\mu_{target}}}{2^{\mu_{source}}} \right\rceil \quad (1)$$

where $\lceil x \rceil$ may represent a ceiling function mapping x to a least integer greater than or equal to x. For example, the selected CC may have a subcarrier spacing of 30 kHz, which may have an associated numerology parameter $\mu_{source}=1$. Another CC may have a subcarrier spacing of 120 kHz, which may have an associated numerology parameter $\mu_{target}=3$. If the delay on the selected CC is two slots, then the delay on the other CC may be eight slots, based on the numerology conversion.

In some examples, the UE may be restricted from receiving an additional indication of another new power mode during the application delay. Accordingly, the base station may refrain from transmitting an indication of another new power mode during the application delay. In some examples, a quantity of active CCs in the CA configuration may change. For example, a new CC may be activated, or a previously active CC may be deactivated. The UE may update the application delay based on the new quantity of active CCs in the CA configuration.

Aspects of the disclosure are initially described in the context of wireless communications systems. Example timing diagrams and an example process flow are then described. Aspects of the disclosure are further illustrated by and described with reference to apparatus diagrams, system diagrams, and flowcharts that relate to application delay for power mode adaptation.

FIG. 1 illustrates an example of a wireless communications system 100 that supports application delay for power mode adaptation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a CA configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RB s)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may communicate with a base station 105 on multiple CCs in a CA configuration. The base station 105 may transmit an indication (to the UE 115) that identifies a new power mode or other adjustment that the UE 115 is to implement for communications. The power mode, as one example, may identify communication parameters the UE 115 is to adjust. The UE 115 may determine a delay for applying the new power mode on the CCs (e.g., a common delay). In some examples, the delay may give the UE 115 time to activate or deactivate hardware components based on the new power mode. In some examples, the UE 115 may determine the delay based on a selected CC, then apply the delay across one or more (or all) of the CCs. The UE 115 may implement the power mode adjustment on one or more (or all) of the CCs following the delay.

Figure 2:
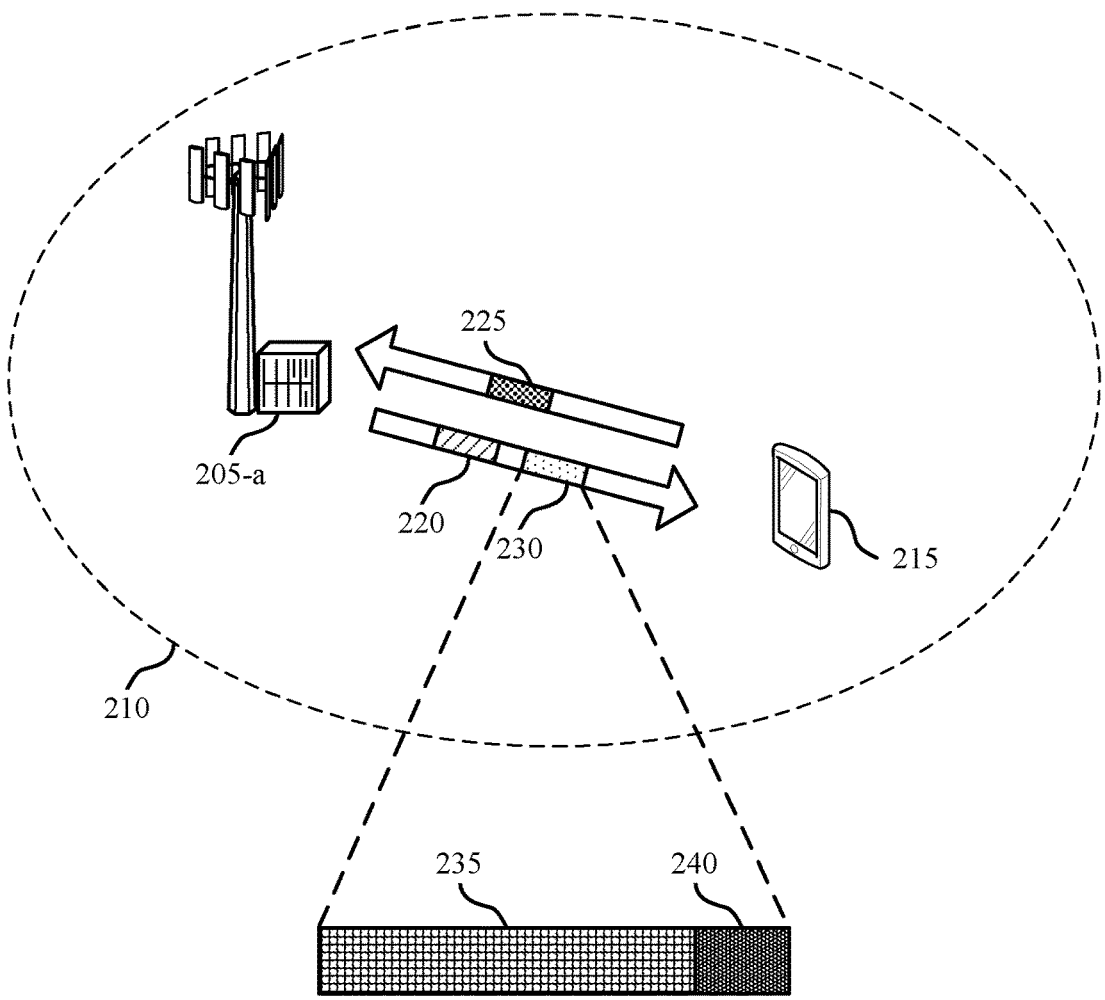
Figure 2:
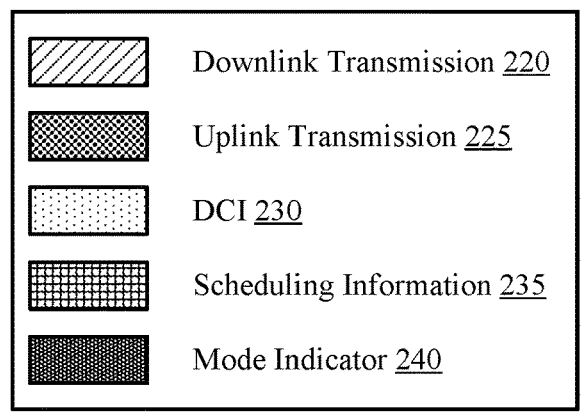

FIG. 2 illustrates an example of a wireless communications system 200 that supports application delay for power mode adaptation in accordance with aspects of the present disclosure. In some examples, the wireless communications system 200 may implement aspects of wireless communications system 100. For example, the wireless communications system 200 may include a base station 205 and a UE 215, which may be examples of the corresponding devices described with reference to FIG. 1. The wireless communications system 200 may include features for improved UE power mode adaptation, among other benefits.

In the wireless communications system 200, the base station 205 may provide a geographic coverage area 210. The base station 205 may transmit downlink transmissions 220 to the UE 215, and the UE 215 may transmit uplink transmissions 225 to the base station 205. In some examples, the UE 215 and the base station 205 may exchange downlink transmissions 220 and uplink transmissions 225 on multiple CCs in a CA configuration. The CA configuration may include intra-band CA, where the UE 215 and the base station 205 may communicate on one or more CCs in the same frequency band. The CCs may be contiguous in frequency or non-contiguous.

The UE 215 may use power-saving techniques to increase communication efficiency and battery life. For example, the UE 215 may operate in a discontinuous reception (DRX) mode, which include an active period and an inactive period. During the inactive period, one or more components of the UE 215 may be deactivated to reduce power consumption. The UE 215 may periodically monitor for signaling (e.g., a wake-up signal or other control signaling) from the base station 205 which may indicate that the UE 215 is to wake up (e.g., activate one or more components) and enter an active period to receive signaling from the base station.

During the active period, the UE 215 may implement additional power-saving techniques. For example, a UE 215 may adapt one or more communication parameters based on an indication from the base station. In some examples, the UE 215 may adapt a scheduling configuration. In a cross-slot scheduling configuration, the UE 215 may receive scheduling information 235 in control signaling such as a DCI 230 in a slot for a downlink transmission 220 (e.g., a data transmission, a PDSCH transmission, etc.) in a different slot. The cross-slot scheduling configuration may enable the UE 215 to enter an inactive period between receiving the scheduling information 235 and receiving the downlink transmission 220 to reduce power consumption.

Alternatively, in a same-slot scheduling configuration, the UE 215 may receive the DCI 230 and the associated downlink transmission 220 in the same slot. A data rate for the same-slot scheduling configuration may be greater than a data rate for the cross-slot scheduling configuration, but the power consumption may be greater as well. For example, in the cross-slot scheduling configuration, a UE 215 may receive a PDCCH transmission, then deactivate transmission hardware components while decoding the PDCCH transmission to determine if the PDCCH transmission contains a DCI 230. Alternatively, in the same-slot configuration, a UE 215 may keep hardware components activated (and consuming power) while decoding the PDCCH transmission in case a downlink transmission 220 is scheduled in the same slot.

The base station 205 may indicate which scheduling mode the UE 215 is to use by indicating to the UE 215 a minimum scheduling offset value, which may be referred to as $K_{0\_min}$, which may indicate a minimum applicable downlink scheduling offset. The value $K_{0\_min}$ may represent a minimum quantity of slots between scheduling information and an associated data transmission. For example, if $K_{0\_min}$ is zero, the UE 215 may be configured for same-slot scheduling. Alternatively, if $K_{0\_min}$ Millis one or more, the UE 215 may be configured for cross-slot scheduling.

The UE 215 may additionally adjust PDCCH monitoring parameters to reduce power consumption. Each time the UE 215 wakes up to monitor for a PDCCH transmission may consume power, and so adjusting the duration between PDCCH monitoring occasions may impact battery life for the UE. The base station 205 may indicate to the UE 215 a minimum PDCCH monitoring periodicity $P_{min}$, where $P_{min}$ may represent a quantity of slots between PDCCH monitoring occasions. Additionally, the base station 205 may indicate to the UE 215 that the UE 215 may skip one or more PDCCH monitoring occasions, which may enable the UE 215 to enter an extended inactive period.

The UE 215 may also reduce power consumption by adjusting a quantity of spatial layers used in MIMO communications. Because the UE 215 uses multiple antennas to transmit or receive the multiple signals, more power may be consumed as more layers are used. The base station 205 may indicate to the UE 215 a maximum quantity of downlink MIMO layers $L_{max}$ the base station 205 will use to transmit downlink transmissions. Based on the value of $L_{max}$, the UE 215 may deactivate one or more radio frequency (RF) components to reduce power consumption.

In some examples, the base station 205 may determine that the UE 215 is to change a power mode (among other examples of potential adjustments) to adjust power consumption at the UE 215. The base station 205 may transmit to the UE 215 an indication of a power mode adaptation, where indication may identify a new power mode the UE 215 is to implement. The power mode may identify one or more communication parameters (e.g., $K_{0\_min}$, $P_{min}$, $L_{max}$, etc.) the UE 215 is to adjust. In some examples, the base station 205 may transmit the indication in higher-layer signaling, such as in a MAC control element (MAC-CE) or in RRC signaling. In some examples, the base station 205 may transmit the indication in a scheduling PDCCH, for example in a DCI 230. Compared to an indication in higher-level signaling, an indication in the DCI 230 may need less overhead signaling, and the UE 215 may implement the new power mode more quickly.

The base station 205 may include a mode indicator 240 in a DCI 230. The mode indicator 240 may include a bit field, where the length of the bit field may be based on the quantity of power modes supported at the UE. For example, if the UE 215 supports N power modes, a field of length M=$\log_2$ N bits may be included in the mode indicator 240 of the DCI 230. In some examples, the UE 215 may support a fallback power mode, in which the UE 215 may not apply any power-saving techniques.

The new power mode may be applied for communications between the base station 205 and the UE 215 after a time delay, which may be referred to as an application delay. A duration of the application delay may be based on a numerology, a current power mode in use at the UE 215, or another factor, or any combination thereof.

In one example, the application delay for implementing a cross-slot scheduling adaptation may be represented by a quantity of slots X. That is, if a new minimum scheduling offset value, which may be referred to as $K_{0\_min\_new}$, is indicated in a slot n, the value $K_{0\_min\_new}$ may be implemented beginning in a slot n+X. In some examples, the quantity of slots X may correspond to the value $K_{0\_min}$ of the current power mode. In some examples, the quantity of slots X may correspond to a minimum processing time based on the numerology. For example, if a subcarrier spacing associated with communications between the base station 205 and the UE 215 is 15 kHz, the minimum processing time may be one slot. Alternatively, if the subcarrier spacing is 120 kHz, the minimum processing time may be two slots. In some examples, the quantity of slots X may be the minimum of the value $K_{0\_min}$ and the minimum processing time.

The power-saving techniques described herein may be implemented when the UE 215 and the base station 205 communicate in the CA configuration. The UE 215 may receive a mode indicator 240 on a CC, and determine a delay for applying a common power mode across one or more (or all) of the CCs in the CA configuration (e.g., using a common delay). In some examples, the UE 215 may select a CC for determining the delay. The selected CC may be an anchor CC or a master CC for the CCs in the CA configuration. Additionally or alternatively, the UE 215 may select the CC based on an index associated with the CC, a subcarrier spacing of the CC, a determined delay associated with the CC, or an indication from the base station, or any combination thereof.

Figure 3:
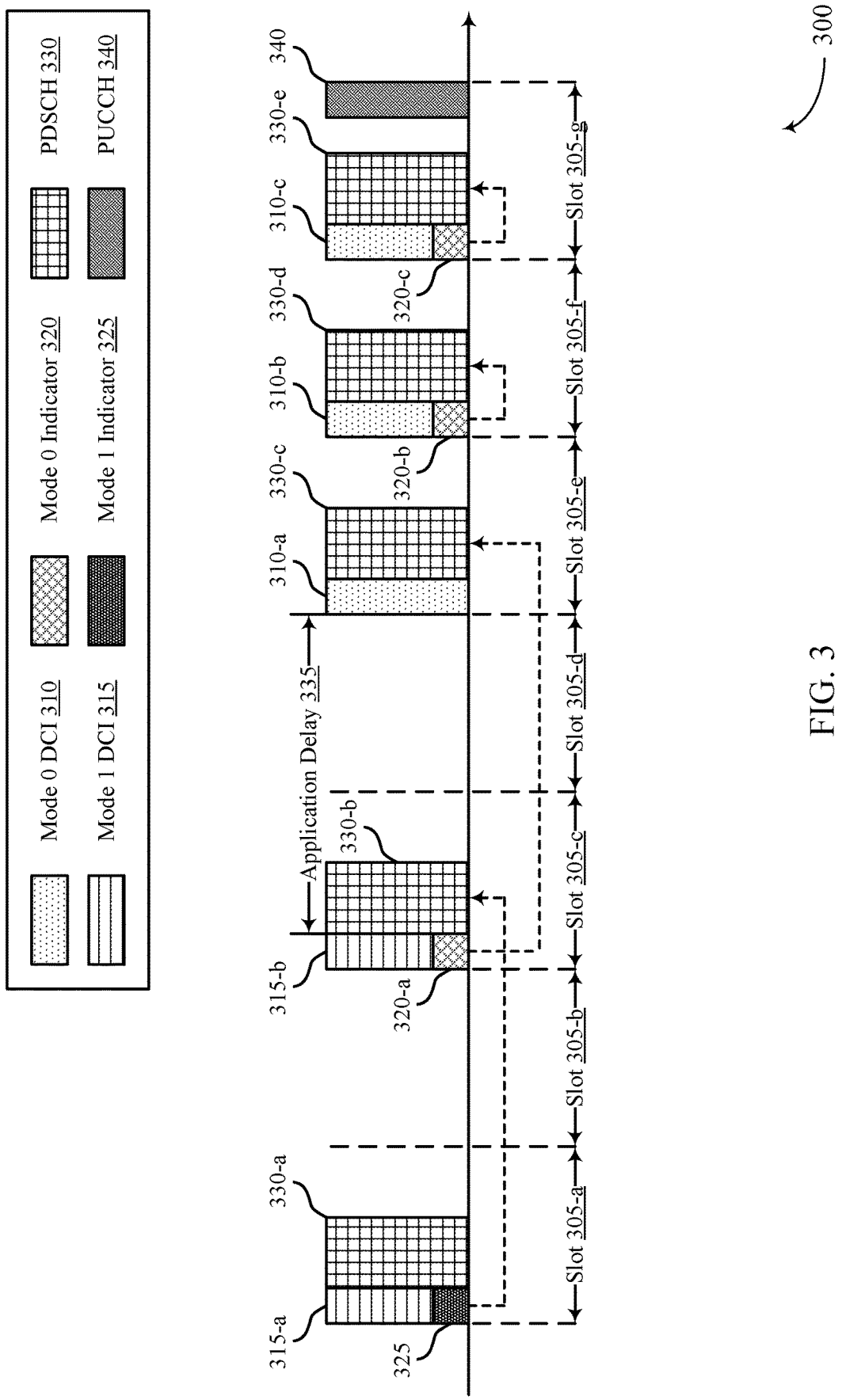
FIG. 3 illustrates an example of a timing diagram that supports application delay for power mode adaptation in accordance with aspects of the present disclosure.

FIG. 3 illustrates an example of a timing diagram 300 that supports application delay for power mode adaptation in accordance with aspects of the present disclosure. In some examples, the timing diagram 300 may implement aspects of wireless communications systems 100 and 200. The timing diagram 300 may be associated with communications between a UE and a base station, which may be examples of corresponding devices described with reference to FIGS. 1 and 2. The timing diagram 300 may illustrate features for improved UE power mode adaptation, among other benefits.

The timing diagram 300 may include communications in slots 305 on one or more CCs in a CA configuration. A UE may initially communicate with a base station based on a power mode, which may be referred to as mode 1, that implements a cross-slot scheduling configuration. That is, a mode 1 DCI 315-a in a slot 305-a may schedule a PDSCH 330-b in a slot 305-c. Similarly, a PDSCH 330-a in the slot 305-a may be scheduled by a mode 1 DCI 315 in a previous slot 305 (not shown). The mode 1 DCI 315-a may also include a mode 1 indicator 325, which may indicate to the UE that the UE is to continue using the communication parameters included in mode 1. For example, mode 1 may include a minimum scheduling offset value $K_{0\_min}$ of two slots. The mode 1 indicator 325 may include a bit field with a length based on the quantity of power modes supported at the UE.

The base station may determine the UE is to implement a new power mode, which may be referred to as mode 0. In some examples, mode 0 may correspond to a fallback power mode, in which the UE may not apply any power-saving techniques. The new power mode may be a common power mode applied to all CCs in the CA configuration. Mode 0 may include a new minimum scheduling offset value $K_{0\_min\_new}$ of zero slots, which may indicate the UE is to implement same-slot scheduling. Accordingly, the base station may transmit a mode 1 DCI 315-b in the slot 305-c that includes a mode 0 indicator 320-a. The mode 1 DCI 315-b may additionally schedule a PDSCH 330-c.

Mode 0 may be applied after an application delay 335. The application delay 335 may be two slots, corresponding to the value $K_{0\_min}$ of the current power mode (e.g., mode 1). The application delay 335 may be common across all CCs in the CA configuration. In some examples, the UE may select a CC for determining the application delay 335. As illustrated in FIG. 3, the UE selects the CC on which the mode 0 indicator 325 is received for determining the application delay 335.

Mode 0 may be applied to communications between the UE and the base station on all CCs beginning at a slot 305-e of the CC shown in the timing diagram 300. The base station may transmit a mode 0 DCI 310-a in the slot 305-e, as well as the PDSCH 330-c scheduled by the mode 1 DCI 315-b. In subsequent slots, the UE may implement the same-slot scheduling configuration included in mode 0. For example, a mode 0 DCI 310-b in a slot 305-f may schedule a PDSCH 330-d in the same slot 305-f, and a mode 0 DCI 310-c in a slot 305-g may schedule a PDSCH 330-e in the same slot 305-g. The mode 0 DCI 310-b and the mode 0 DCI 310-c may each include a mode 0 indicator 320, which may indicate to the UE that the UE is to continue using the communication parameters included in mode 0.

The UE may additionally transmit a PUCCH 340 in the slot 305-g. In some examples, the PUCCH 340 may include an acknowledgment of the power mode adaption, or an indication that the power mode adaptation was successful, or a combination thereof. Additionally or alternatively, the PUCCH 340 may include a request for an adjusted power mode to reduce power consumption at the UE. Based on the request, the base station may determine to indicate a new power mode to the UE. The timing diagram 300 may support improved implementation of UE power mode adaptation, among other benefits.

Figure 4:
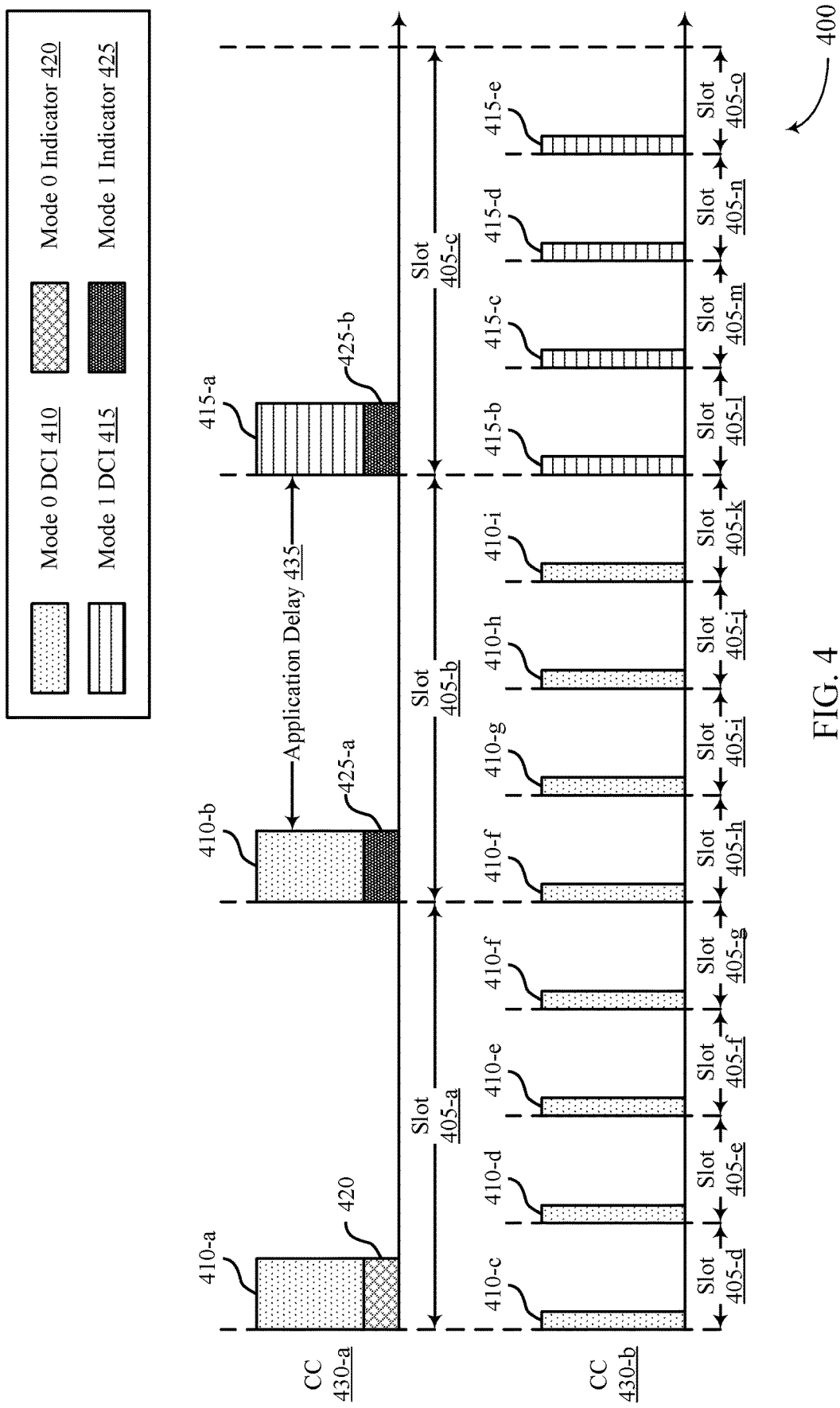
FIG. 4 illustrates an example of a timing diagram that supports application delay for power mode adaptation in accordance with aspects of the present disclosure.

FIG. 4 illustrates an example of a timing diagram 400 that supports application delay for power mode adaptation in accordance with aspects of the present disclosure. In some examples, the timing diagram 400 may implement aspects of wireless communications systems 100 and 200. The timing diagram 400 may be associated with communications between a UE and a base station, which may be examples of corresponding devices described with reference to FIGS. 1 and 2. The timing diagram 400 may illustrate features for improved UE power mode adaptation, among other benefits.

The timing diagram 400 may include communications in slots 405 on one or more CCs 430 in a CA configuration. A UE may initially communicate with a base station based on a power mode, which may be referred to as mode 0. In some examples, the UE may implement a same-slot scheduling configuration when operating in mode 0. That is, a mode 0 DCI 410-a in a slot 405-a on a CC 430-a may schedule a PDSCH transmission in the same slot 405-*a*. The mode 0 DCI 410-*a* may also include a mode 0 indicator 420, which may indicate to the UE that the UE is to continue using the communication parameters included in mode 0. For example, mode 0 may correspond to a fallback power mode, in which the UE may not apply any power-saving techniques. The mode 0 indicator 420 may include a bit field with a length based on the quantity of power modes supported at the UE.

The CC 430-*a* may have an associated numerology. For example, the CC 430-*a* may have a subcarrier spacing of 30 kHz. The UE may additionally communicate with the base station on a CC 430-*b*. The CC 430-*b* may have an associated numerology different than that of the CC 430-*a*. For example, the CC 430-*b* may have a subcarrier spacing of 120 kHz. Based on the difference in numerologies, slots 405 on the CC 430-*a* may have a different duration than slots 405 on the CC 430-*b*. As illustrated in FIG. 4, the duration of the slot 405-*a* on the CC 430-*a* corresponds to the combined durations of slots 405-*d* through 405-*g* on the CC 430-*b*.

The UE may operate in a common (e.g., joint) power mode across all CCs 430 in the CA configuration to efficiently control power consumption. For example, the CC 430-*a* and the CC 430-*b* may be in a same frequency band, and the UE may use the same hardware components for communications on the CC 430-*a* and the CC 430-*b*. Accordingly, the UE and the base station may operate in mode 0 for communications on both the CC 430-*a* and the CC 430-*b*. That is, the base station may transmit a mode 0 DCI 410 in each of the slots 405-*d* through 405-*g* on the CC 430-*b*.

The base station may determine the UE is to implement a new power mode, which may be referred to as mode 1. In some examples, mode 1 may include a cross-slot scheduling configuration. The cross-slot scheduling configuration may include a new minimum scheduling offset value $K_{0\_min\_new}$ for each CC 430. For example, the new minimum scheduling offset value $K_{0\_min\_new\_a}$ for the CC 430-*a* may be one slot, while the new minimum scheduling offset value $K_{0\_min\_new\_b}$ for the CC 430-*b* may be three slots. The base station may indicate that the UE is to implement mode 1 by including a mode 1 indicator 425-*a* in a mode 0 DCI 410-*b* in a slot 405-*b* on the CC 430-*a*.

Mode 1 may be applied after an application delay 435. The UE may select a CC 430 to use for determining the application delay 435. As illustrated in FIG. 4, the UE may select the CC 430-*a* for making the determination. In some examples, the UE may select the CC 430-*a* based on receiving the mode 1 indicator 425-*a* on the CC 430-*a*. In some examples, the UE may select the CC 430-*a* based on the CC 430-*a* having a smaller numerology than the CC 430-*b*. In some examples, the UE may select the CC 430-*a* based on determining the CC 430-*a* has a smaller delay in slots. For example, the UE may determine that a delay for adapting from mode 0 to mode 1 on the CC 430-*a* is one slot, while a delay for adapting from mode 0 to mode 1 on the CC 430-*b* is two slots.

The application delay 435 may be common for the CC 430-*a* and the CC 430-*b*. That is, the application delay 435 may correspond to one slot on the CC 430-*a* and four slots on the CC 430-*b*, despite the delay for adapting from mode 0 to mode 1 on the CC 430-*b* alone being two slots. Accordingly, the UE and the base station may continue to operate in mode 0 for communications in slots 405-*h* through 405-*k* on the CC 430-*b*, which may include the base station transmitting a mode 0 DCI 410 in each of the slots 405-*h* through 405-*k*. In some examples, the UE may be restricted from receiving an additional indication of another new power mode (e.g., a mode 0 indicator 420 or a mode 1 indicator 425) during the application delay 435. Accordingly, the base station may refrain from transmitting an indication of another new power mode during the application delay 435. For example, a mode 0 DCI 410-*g*, a mode 0 DCI 410-*h*, and a mode 0 DCI 410-*i* in the respective slots 405-*i*, 405-*j*, and 405-*k* may not include an indication of a new power mode.

Following the application delay 435, the UE and the base station may begin to operate in mode 1 for communications on the CC 430-*a* and the CC 430-*b*. That is, the base station may transmit a mode 1 DCI 415-*a* in a slot 405-*c* on the CC 430-*b*, which may schedule a PDSCH transmission in a subsequent slot 405 (not shown). The mode 1 DCI 415-*a* may also include a mode 1 indicator 425-*b*, which may indicate to the UE that the UE is to continue using the communication parameters included in mode 1. Similarly, the base station may transmit a mode 1 DCI 415-*b* in a slot 405-1. According to the minimum scheduling offset value $K_{0\_min\_new\_b}$ for the CC 430-*b* in mode 1, the mode 1 DCI 415-*b* may schedule a PDSCH transmission (not shown) in a slot 405-*o*. According to the techniques described herein, the timing diagram 400 may support improved implementation of UE power mode adaptation, among other benefits.

Figure 5:
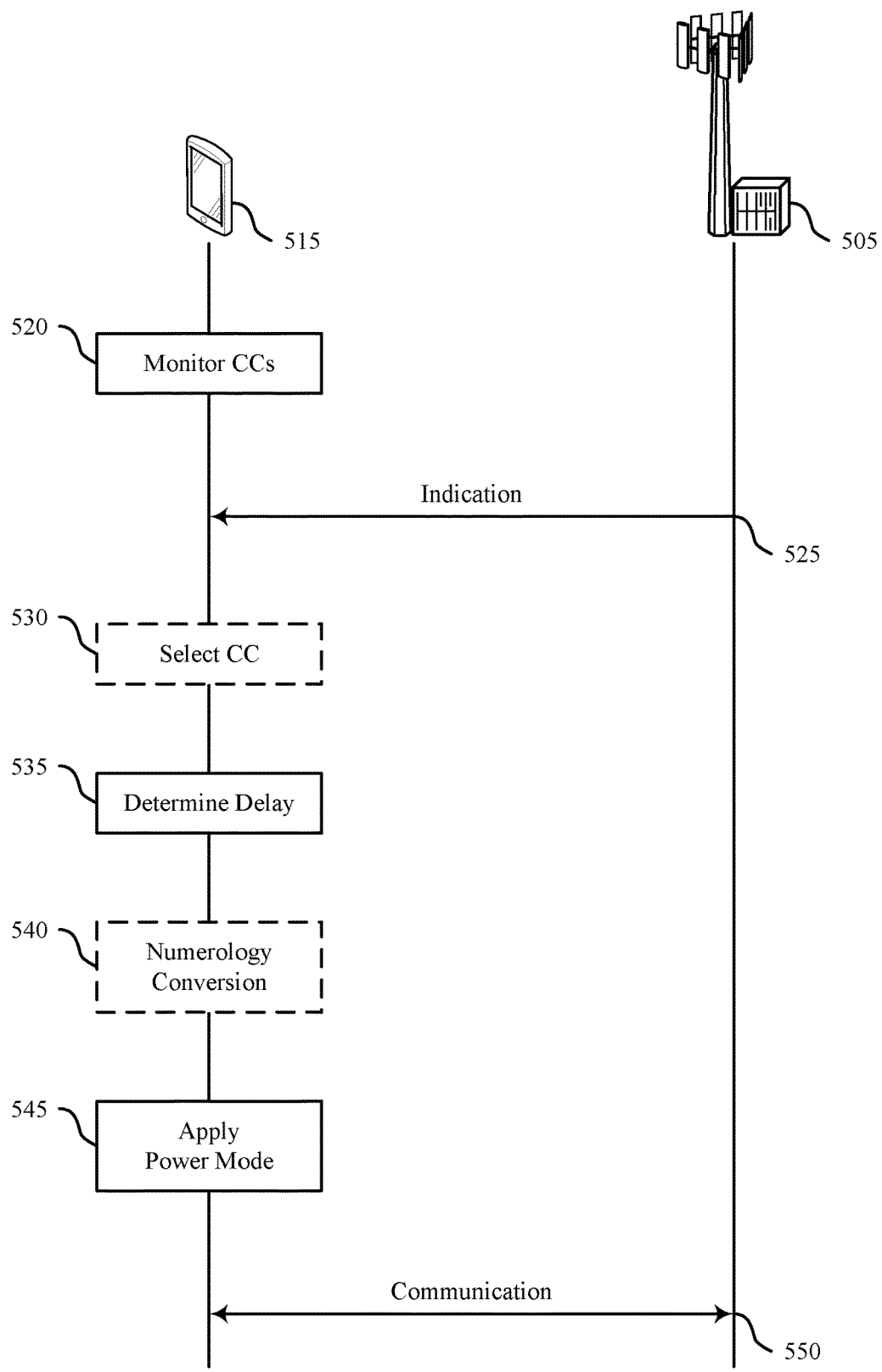
FIG. 5 illustrates an example of a process flow that supports application delay for power mode adaptation in accordance with aspects of the present disclosure.

FIG. 5 illustrates an example of a process flow 500 that supports application delay for power mode adaptation in accordance with aspects of the present disclosure. In some examples, process flow 500 may implement aspects of wireless communications 200 systems 100 and 200. For example, the process flow 500 may include example operations associated with one or more of a base station 505 or a UE 515, which may be examples of the corresponding devices described with reference to FIGS. 1 and 2. In the following description of the process flow 500, the operations between the base station 505 and the UE 515 may be performed in a different order than the example order shown, or the operations performed by the base station 505 and the UE 515 may be performed in different orders or at different times. Some operations may also be omitted from the process flow 500, and other operations may be added to the process flow 500. The operations performed by the base station 505 and the UE 515 may support improvement to the UE 515 transmission operations and, in some examples, may promote improvements to the UE 515 implementation of a power mode adaptation, among other benefits.

At 520, the UE 515 may monitor multiple CCs in a CA configuration for communications with the base station 505. The CA configuration may include intra-band CA, where the UE 515 may communicate on one or more CCs in the same frequency band. The CCs may be contiguous in frequency or non-contiguous. In some examples, the UE 515 may monitor for PDCCH transmissions on the CCs.

At 525, the base station 505 may transmit an indication to the UE 515. The UE 515 may receive the indication based on monitoring the CCs. The indication may identify a new power mode the UE 515 is to implement for communications with the base station 505. For example, the new power mode may identify one or more communication parameters (e.g., $K_{0\_min}$, $P_{min}$, $L_{max}$, etc.) the UE 515 is to adjust. In some examples, the base station 505 may transmit the indication in higher-layer signaling, such as in a MAC-CE or in RRC signaling. In some examples, the base station 505 may transmit the indication in a scheduling PDCCH, for example in a DCI. Compared to an indication in higher-level signaling, an indication in the DCI may need less overhead signaling, and the UE 515 may implement the new power mode more quickly.

The UE 515 may determine to apply the power mode across the CCs in the CA configuration. In some examples, at 530 the UE 515 may select a CC for determining a delay for applying the power mode. The selected CC may be an anchor CC or a master CC for the CCs in the CA configuration. Additionally or alternatively, the UE may select the CC based on an index associated with the CC, a subcarrier spacing of the CC, a determined delay associated with the CC, or an indication from the base station, or any combination thereof.

At 535, the UE 515 may determine the delay for applying the power mode. In some examples, the UE 515 may determine the delay based on the selected CC. A duration of the delay, which may be a common delay, may be based on a processing time corresponding to one or more numerologies associated with one or more of the CCs, a processing time corresponding to adjusting hardware components at the UE 515, a scheduling offset value (e.g., $K_{0\_min}$) associated with downlink transmissions, a current power mode in use at the UE 515, one or more numerologies associated with one or more of the CCs, or any combination thereof. The base station 505 may also determine the delay at 535.

In some examples, a quantity of active CCs in the CA configuration may change. For example, a new CC may be activated, or a previously active CC may be deactivated. The UE 515 may update the delay based on the new quantity of active CCs in the CA configuration.

In some examples, different CCs may have different associated numerologies. At 540, the UE 515 may use a numerology conversion to the determined delay to ensure that the new power mode is applied concurrently on all CCs. The UE 515 may use the numerology conversion to determine the delay in slots on each CC. For example, the selected CC may have a subcarrier spacing of 30 kHz. Another CC may have a subcarrier spacing of 120 kHz. If the delay on the selected CC is two slots, then the delay on the other CC may be eight slots, based on the numerology conversion.

At 545, the UE 515 may apply the power mode for communications with the base station 505 on the CCs in the CA configuration. The UE 515 may apply the power mode concurrently on all CCs following the delay. Applying the power mode may include activating or deactivating hardware components at the UE 515, such as one or more antennas. At 550, the UE 515 and the base station 505 may communicate based on the new power mode. For example, the base station 505 may transmit PDCCH transmissions including scheduling information for cross-slot scheduling, or the UE 515 may monitor for PDCCH transmission based on a periodicity defined by the power mode.

The operations performed by the UE 515 and the base station 505 may therefore support improvements to implementing a power mode adaptation at the UE 515 and, in some examples, may promote improvements to the reliability of communications between the UE 515 and the base station 505, among other benefits.

Figure 6:
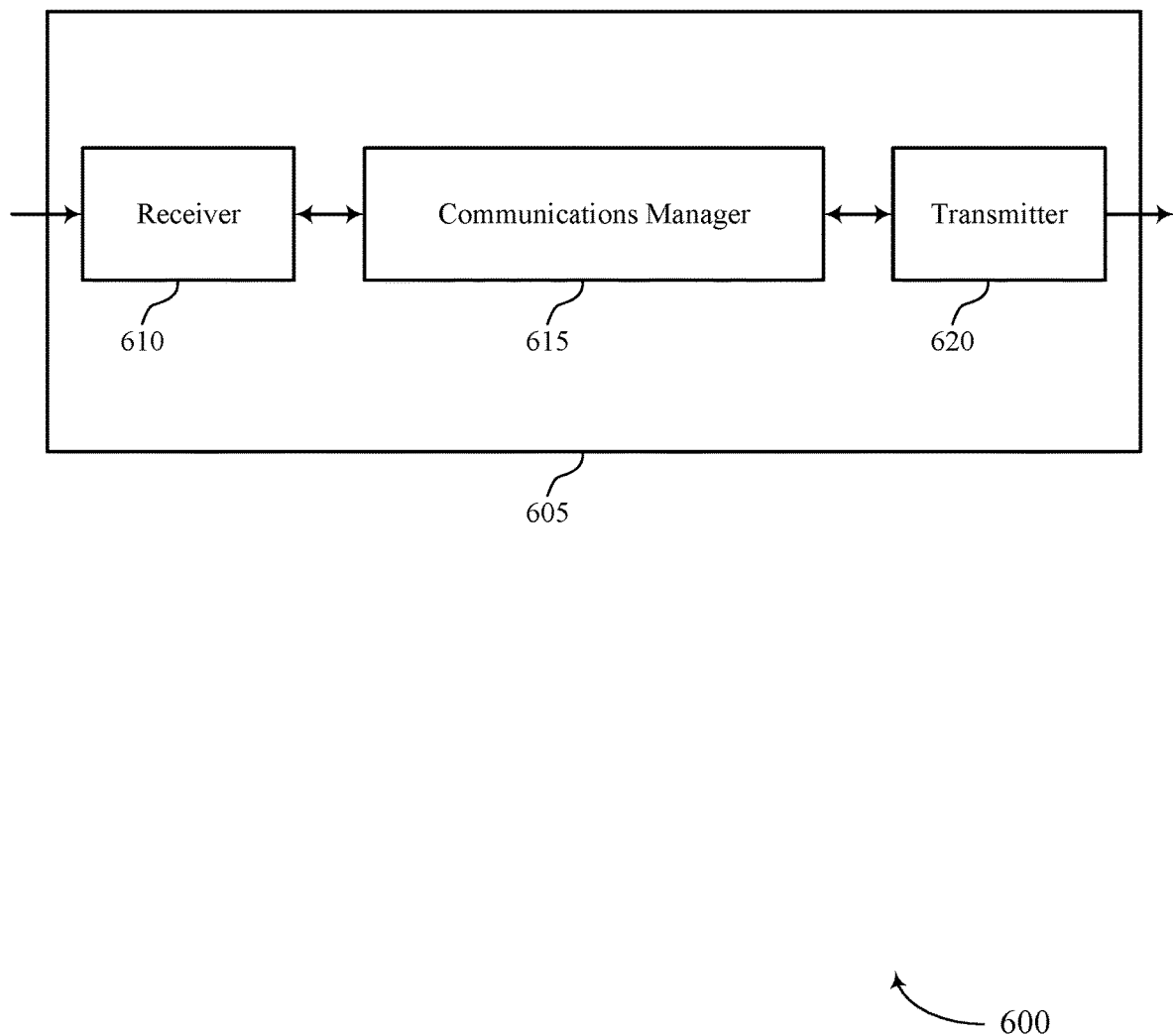
FIGS. 6 and 7 show block diagrams of devices that support application delay for power mode adaptation in accordance with aspects of the present disclosure.

FIG. 6 shows a block diagram 600 of a device 605 that supports application delay for power mode adaptation in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to application delay for power mode adaptation, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may monitor a set of CCs in a CA configuration, receive, based on the monitoring, an indication of a power mode adaptation for the set of CCs, determine a delay for applying the power mode adaptation to the set of CCs, apply the power mode adaptation to the set of CCs after the delay, and communicate, based on applying the power mode adaptation, with a base station on one or more CCs of the set of CCs.

The communications manager 615 as described herein may be implemented to realize one or more potential advantages. One implementation may allow the device 605 to save power and increase battery life by communicating with a base station 105 (as shown in FIG. 1) more efficiently. For example, the device 605 may efficiently communicate with a base station 105 in a CA configuration, as the device 605 may be able to concurrently apply power modes across CCs and resolve ambiguities arising from mismatched application delays. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
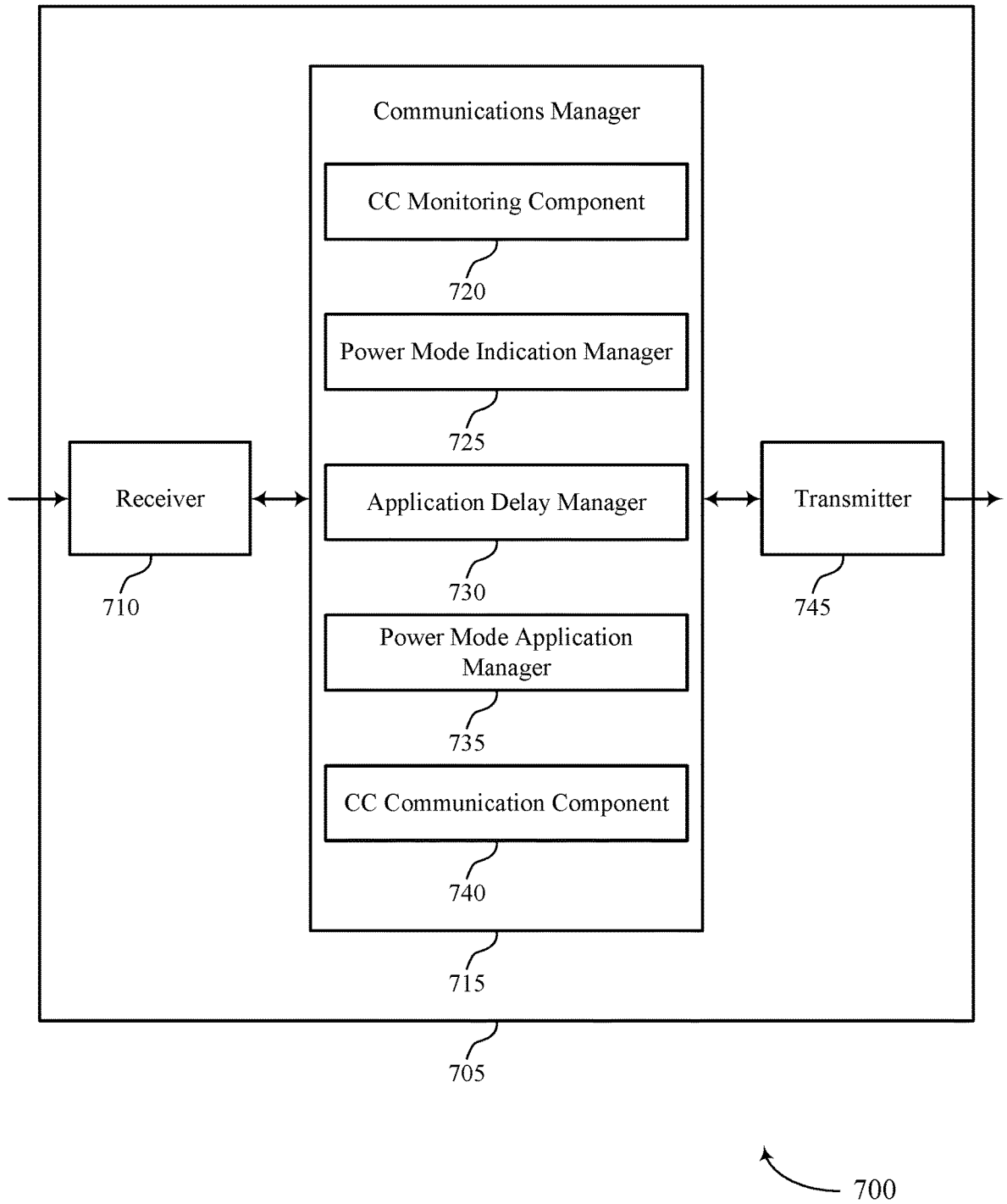

FIG. 7 shows a block diagram 700 of a device 705 that supports application delay for power mode adaptation in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to application delay for power mode adaptation, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a CC monitoring component 720, a power mode indication manager 725, an application delay manager 730, a power mode application manager 735, and a CC communication component 740. The communications manager 715 may be an example of aspects of the communications manager 910 described herein.

The CC monitoring component 720 may monitor a set of CCs in a CA configuration.

The power mode indication manager 725 may receive, based on the monitoring, an indication of a power mode adaptation for the set of CCs.

The application delay manager 730 may determine a delay for applying the power mode adaptation to the set of CCs.

The power mode application manager 735 may apply the power mode adaptation to the set of CCs after the delay.

The CC communication component 740 may communicate, based on applying the power mode adaptation, with a base station on one or more CCs of the set of CCs.

The transmitter 745 may transmit signals generated by other components of the device 705. In some examples, the transmitter 745 may be collocated with a receiver 710 in a transceiver component. For example, the transmitter 745 may be an example of aspects of the transceiver 920 described with reference to FIG. 9. The transmitter 745 may utilize a single antenna or a set of antennas.

Figure 8:
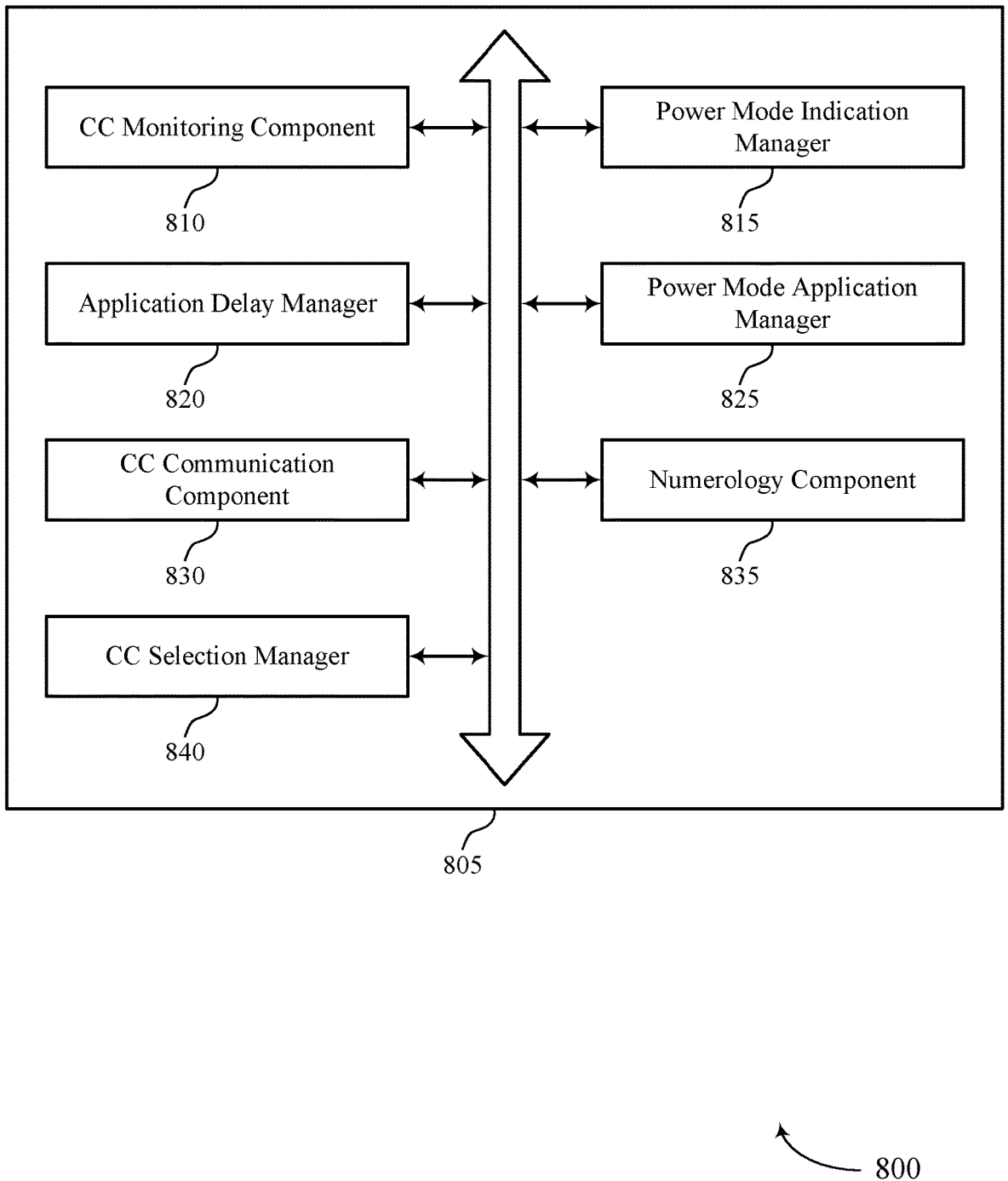
FIG. 8 shows a block diagram of a communications manager that supports application delay for power mode adaptation in accordance with aspects of the present disclosure.

FIG. 8 shows a block diagram 800 of a communications manager 805 that supports application delay for power mode adaptation in accordance with aspects of the present disclosure. The communications manager 805 may be an example of aspects of a communications manager 615, a communications manager 715, or a communications manager 910 described herein. The communications manager 805 may include a CC monitoring component 810, a power mode indication manager 815, an application delay manager 820, a power mode application manager 825, a CC communication component 830, a numerology component 835, and a CC selection manager 840. Each of these components may communicate, directly or indirectly, with one another (e.g., via one or more buses).

The CC monitoring component 810 may monitor a set of CCs in a CA configuration. In some examples, the CC monitoring component 810 may identify a change in an activation status of one or more of the set of CCs.

The power mode indication manager 815 may receive, based on the monitoring, an indication of a power mode adaptation for the set of CCs. In some examples, the power mode indication manager 815 may receive the indication in DCI, RRC signaling, a MAC-CE, or any combination thereof. In some examples, the power mode indication manager 815 may receive the indication of the power mode adaptation on the selected CC.

The application delay manager 820 may determine a delay for applying the power mode adaptation to the set of CCs. In some examples, the application delay manager 820 may determine the delay based on a processing time corresponding to one or more numerologies associated with one or more of the set of CCs, a processing time corresponding to adjusting hardware components at the user equipment, a scheduling offset value associated with downlink transmissions, a current power mode for the set of CCs, one or more numerologies associated with one or more of the set of CCs, or any combination thereof.

In some examples, the application delay manager 820 may update the delay for applying the power mode adaptation based on identifying the change in the activation status. In some examples, the application delay manager 820 may determine the delay based on one or more parameters associated with the selected CC. In some examples, the application delay manager 820 may determine, for each CC of the set of CCs, a respective delay for applying the power mode adaptation to the set of CCs based on the parameters.

The power mode application manager 825 may apply the power mode adaptation to the set of CCs after the delay. In some examples, the power mode application manager 825 may adjust, based on the indication of the power mode adaptation, a downlink scheduling offset, a PDCCH monitoring periodicity, a quantity of downlink communication layers, or any combination thereof. In some examples, the power mode application manager 825 may apply the power mode adaptation to the set of CCs after the updated delay.

The CC communication component 830 may communicate, based on applying the power mode adaptation, with a base station on one or more CCs of the set of CCs. In some examples, the CC communication component 830 may communicate on the first CC based on applying the power mode adaptation after the first quantity of slots. In some examples, the CC communication component 830 may communicate on the second CC based on applying the power mode adaptation after the second quantity of slots.

The numerology component 835 may determine a first quantity of slots associated with the delay for a first CC of the set of CCs based on a first numerology associated with the first CC. In some examples, the numerology component 835 may determine a second quantity of slots associated with the delay for a second CC of the set of CCs based on a second numerology associated with the second CC.

The CC selection manager 840 may select a CC of the set of CCs. In some cases, the selected CC includes an anchor CC or a master CC of the set of CCs. In some cases, the selected CC has a highest index of the set of CCs. In some cases, the selected CC has a lowest index of the set of CCs. In some cases, the selected CC has a largest subcarrier spacing of the set of CCs. In some cases, the selected CC has a smallest subcarrier spacing of the set of CCs. In some cases, the selected CC has a smallest delay of the set of CCs. In some cases, the selected CC has a largest delay of the set of CCs.

Figure 9:
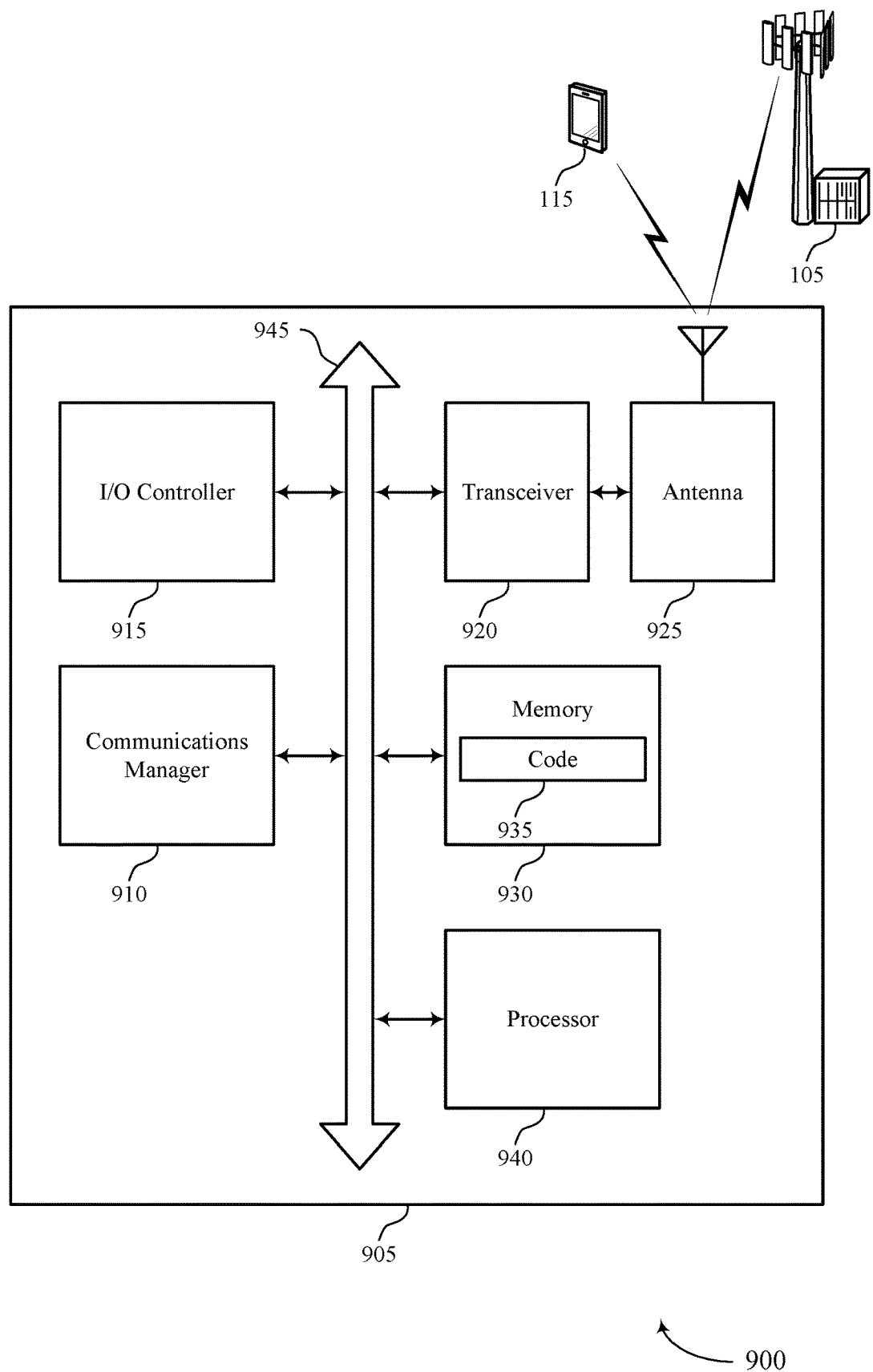
FIG. 9 shows a diagram of a system including a device that supports application delay for power mode adaptation in accordance with aspects of the present disclosure.

FIG. 9 shows a diagram of a system 900 including a device 905 that supports application delay for power mode adaptation in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may monitor a set of CCs in a CA configuration, receive, based on the monitoring, an indication of a power mode adaptation for the set of CCs, determine a delay for applying the power mode adaptation to the set of CCs, apply the power mode adaptation to the set of CCs after the delay, and communicate, based on applying the power mode adaptation, with a base station on one or more CCs of the set of CCs.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include read-only memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting application delay for power mode adaptation).

The processor 940 of the device 905 (e.g., controlling the receiver 610, the transmitter 620, or the transceiver 920) may reduce power consumption and increase communications efficiency based on applying the power mode adaptation concurrently across the CCs in the CA configuration. In some examples, the processor 940 of the device 905 may reconfigure parameters for implementing the new power mode. For example, the processor 940 of the device 905 may turn on one or more processing units for adjusting communication parameters, increase a processing clock, or a similar mechanism within the device 905. As such, when subsequent power mode indications are received, the processor 940 may be ready to respond more efficiently through the reduction of a ramp up in processing power. The improvements in power saving and power mode implementation efficiency may further increase battery life at the device 905.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
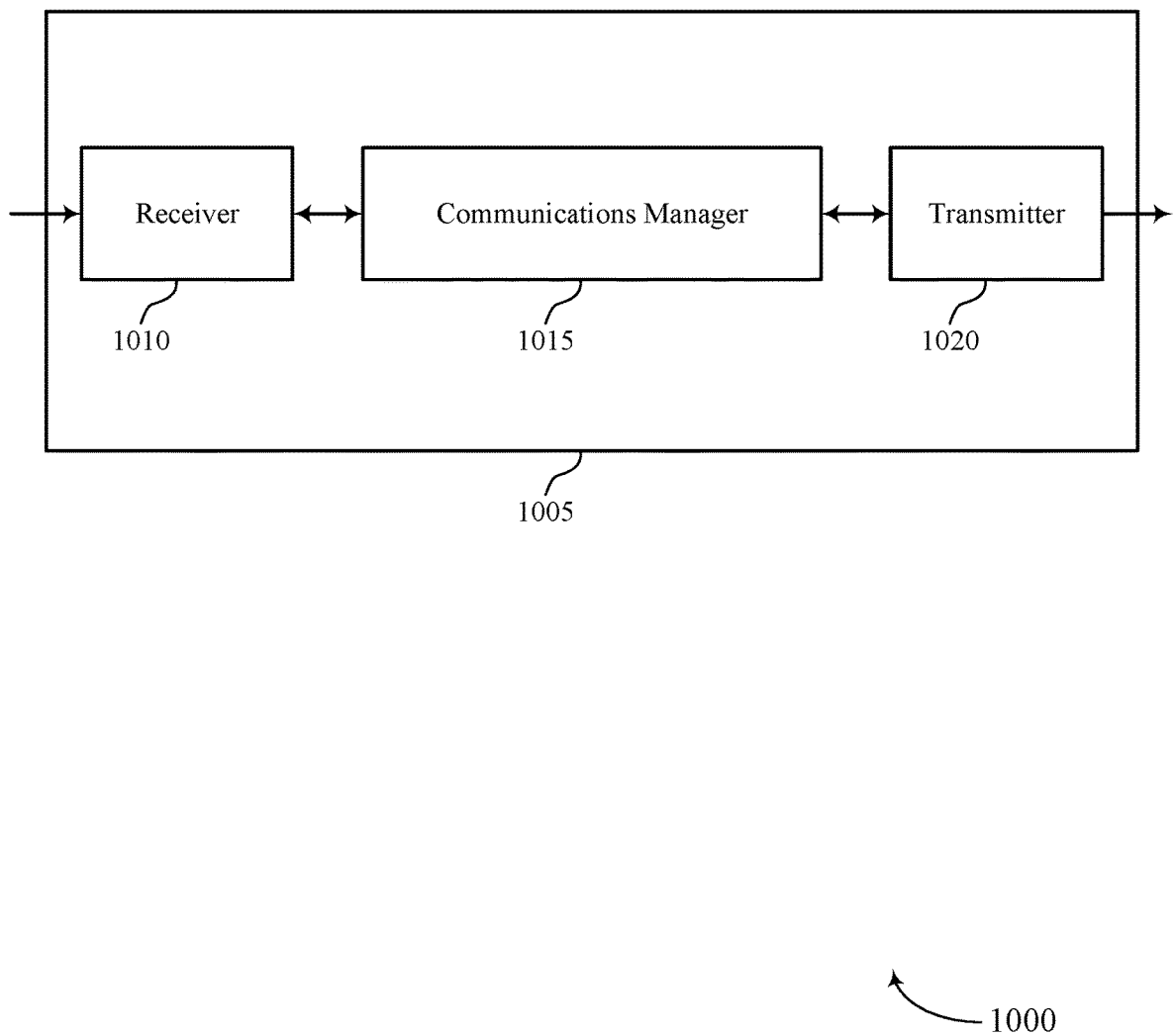
FIGS. 10 and 11 show block diagrams of devices that support application delay for power mode adaptation in accordance with aspects of the present disclosure.

FIG. 10 shows a block diagram 1000 of a device 1005 that supports application delay for power mode adaptation in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to application delay for power mode adaptation, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, an indication of a power mode adaptation for a set of CCs in a carrier aggregation configuration, determine, based on transmitting the indication of the power mode adaptation, a delay for applying the power mode adaptation to the set of CCs at the UE, and communicate, after the delay, with the UE on one or more CCs of the set of CCs based on the power mode adaptation.

The communications manager 1015 as described herein may be implemented to realize one or more potential advantages. One implementation may allow the device 1005 to save power by communicating with a UE 115 (as shown in FIG. 1) more efficiently. For example, the device 1005 may improve reliability in communications with a UE 115, as the device 1005 may be able to identify when a power mode is applied at the UE 115 and adjust communications in a CA configuration accordingly. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
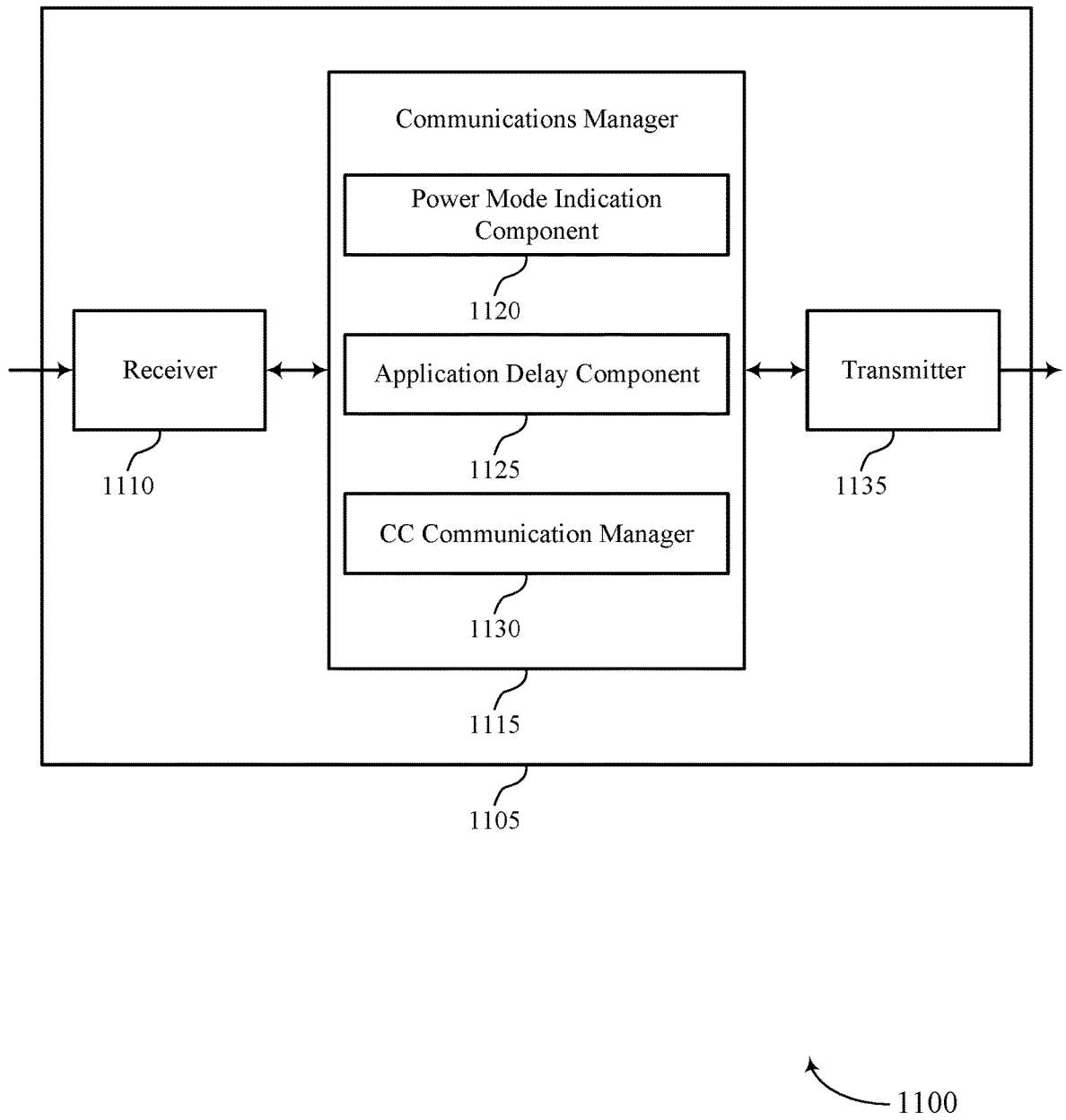

FIG. 11 shows a block diagram 1100 of a device 1105 that supports application delay for power mode adaptation in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to application delay for power mode adaptation, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a power mode indication component 1120, an application delay component 1125, and a CC communication manager 1130. The communications manager 1115 may be an example of aspects of the communications manager 1310 described herein.

The power mode indication component 1120 may transmit, to a UE, an indication of a power mode adaptation for a set of CCs in a CA configuration.

The application delay component 1125 may determine, based on transmitting the indication of the power mode adaptation, a delay for applying the power mode adaptation to the set of CCs at the UE.

The CC communication manager 1130 may communicate, after the delay, with the UE on one or more CCs of the set of CCs based on the power mode adaptation.

The transmitter 1135 may transmit signals generated by other components of the device 1105. In some examples, the transmitter 1135 may be collocated with a receiver 1110 in a transceiver component. For example, the transmitter 1135 may be an example of aspects of the transceiver 1320 described with reference to FIG. 13. The transmitter 1135 may utilize a single antenna or a set of antennas.

Figure 12:
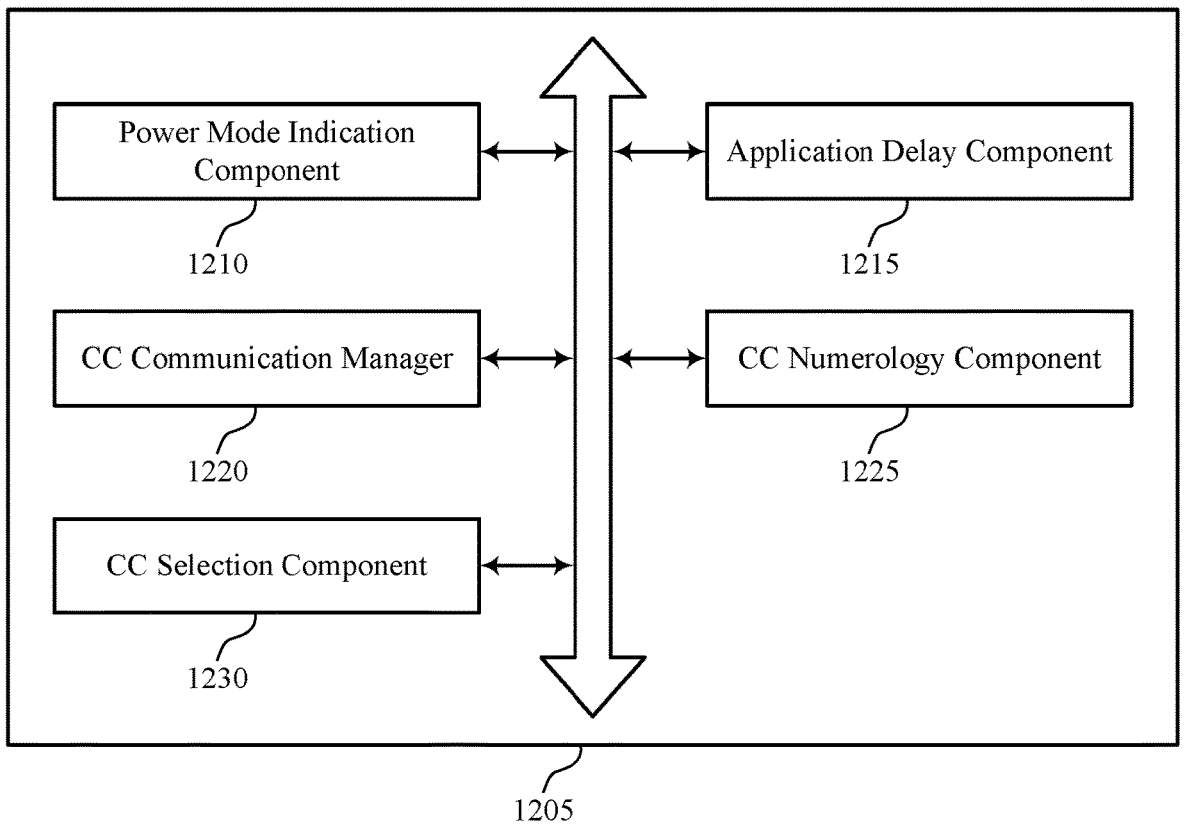
FIG. 12 shows a block diagram of a communications manager that supports application delay for power mode adaptation in accordance with aspects of the present disclosure.

FIG. 12 shows a block diagram 1200 of a communications manager 1205 that supports application delay for power mode adaptation in accordance with aspects of the present disclosure. The communications manager 1205 may be an example of aspects of a communications manager 1015, a communications manager 1115, or a communications manager 1310 described herein. The communications manager 1205 may include a power mode indication component 1210, an application delay component 1215, a CC communication manager 1220, a CC numerology component 1225, and a CC selection component 1230. Each of these components may communicate, directly or indirectly, with one another (e.g., via one or more buses).

The power mode indication component 1210 may transmit, to a UE, an indication of a power mode adaptation for a set of CCs in a carrier aggregation configuration. In some examples, the power mode indication component 1210 may refrain from transmitting an indication of a second power mode adaptation for the set of CCs during the delay. In some examples, the power mode indication component 1210 may transmit the indication in DCI, RRC signaling, a MAC-CE, or any combination thereof. In some examples, the power mode indication component 1210 may transmit the indication of the power mode adaptation on the selected CC.

The application delay component 1215 may determine, based on transmitting the indication of the power mode adaptation, a delay for applying the power mode adaptation to the set of CCs at the UE. In some examples, the application delay component 1215 may determine the delay based on a processing time at the UE corresponding to one or more numerologies associated with one or more of the set of CCs, a processing time corresponding to adjusting hardware components at the UE, a scheduling offset value associated with downlink transmissions, a current power mode at the UE for the set of CCs, one or more numerologies associated with one or more of the set of CCs, or any combination thereof.

In some examples, the application delay component 1215 may update the delay for applying the power mode adaptation based on identifying the change in the activation status. In some examples, the application delay component 1215 may determine the delay based on one or more parameters associated with the selected CC.

The CC communication manager 1220 may communicate, after the delay, with the UE on one or more CCs of the set of CCs based on the power mode adaptation. In some examples, the CC communication manager 1220 may communicate on the first CC based on applying the power mode adaptation after the first quantity of slots. In some examples, the CC communication manager 1220 may communicate on the second CC based on applying the power mode adaptation after the second quantity of slots. In some examples, the CC communication manager 1220 may identify a change in an activation status of one or more of the set of CCs. In some examples, the CC communication manager 1220 may communicate, after the updated delay, with the UE on one or more CCs of the set of CCs based on the power mode adaptation.

The CC numerology component 1225 may determine a first quantity of slots associated with the delay for a first CC of the set of CCs based on a first numerology associated with the first CC. In some examples, the CC numerology component 1225 may determine a second quantity of slots associated with the delay for a second CC of the set of CCs based on a second numerology associated with the second CC.

The CC selection component 1230 may identify a selected CC of the set of CCs.

Figure 13:
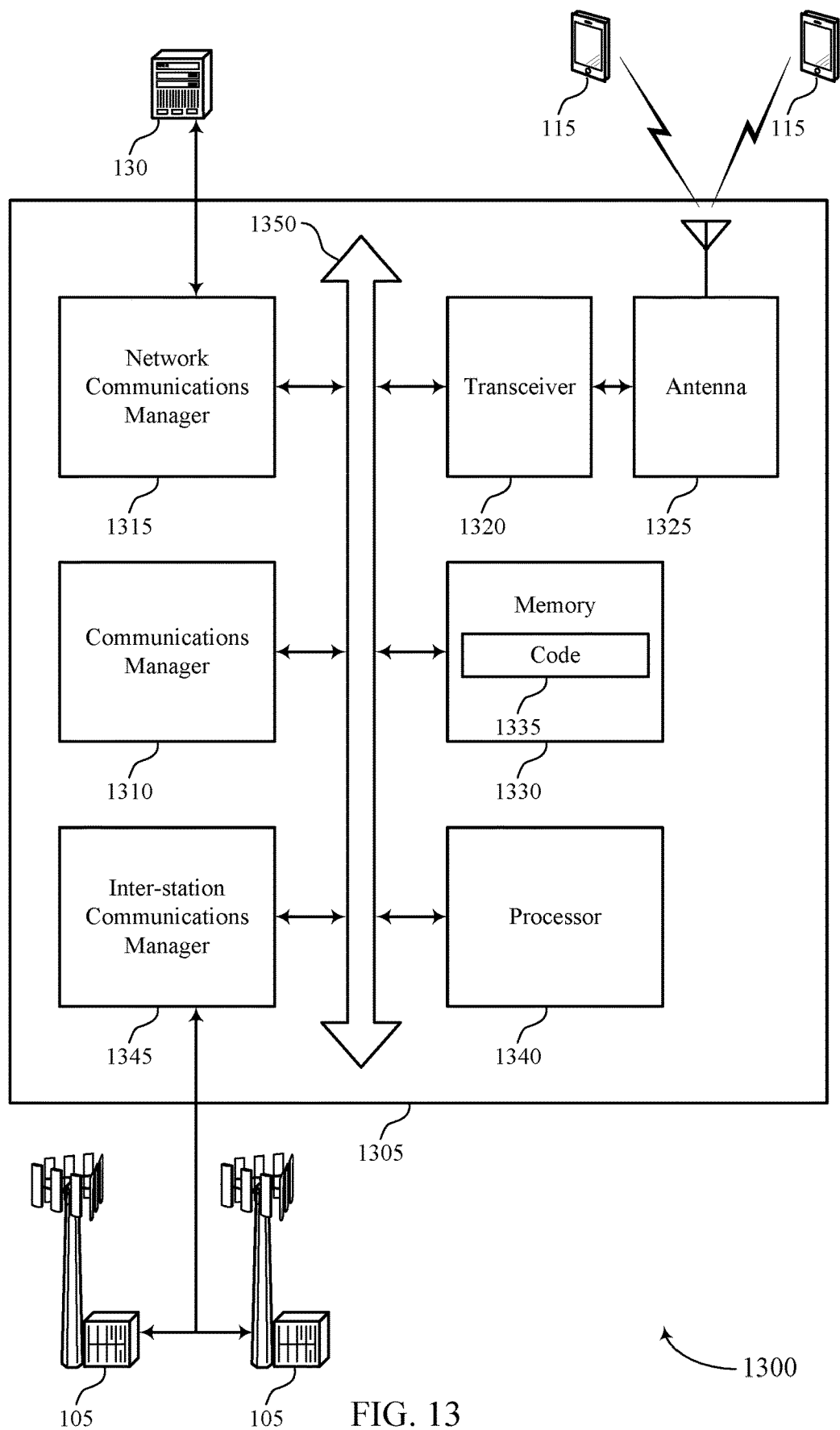
FIG. 13 shows a diagram of a system including a device that supports application delay for power mode adaptation in accordance with aspects of the present disclosure.

FIG. 13 shows a diagram of a system 1300 including a device 1305 that supports application delay for power mode adaptation in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, an indication of a power mode adaptation for a set of CCs in a carrier aggregation configuration, determine, based on transmitting the indication of the power mode adaptation, a delay for applying the power mode adaptation to the set of CCs at the UE, and communicate, after the delay, with the UE on one or more CCs of the set of CCs based on the power mode adaptation.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting application delay for power mode adaptation).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
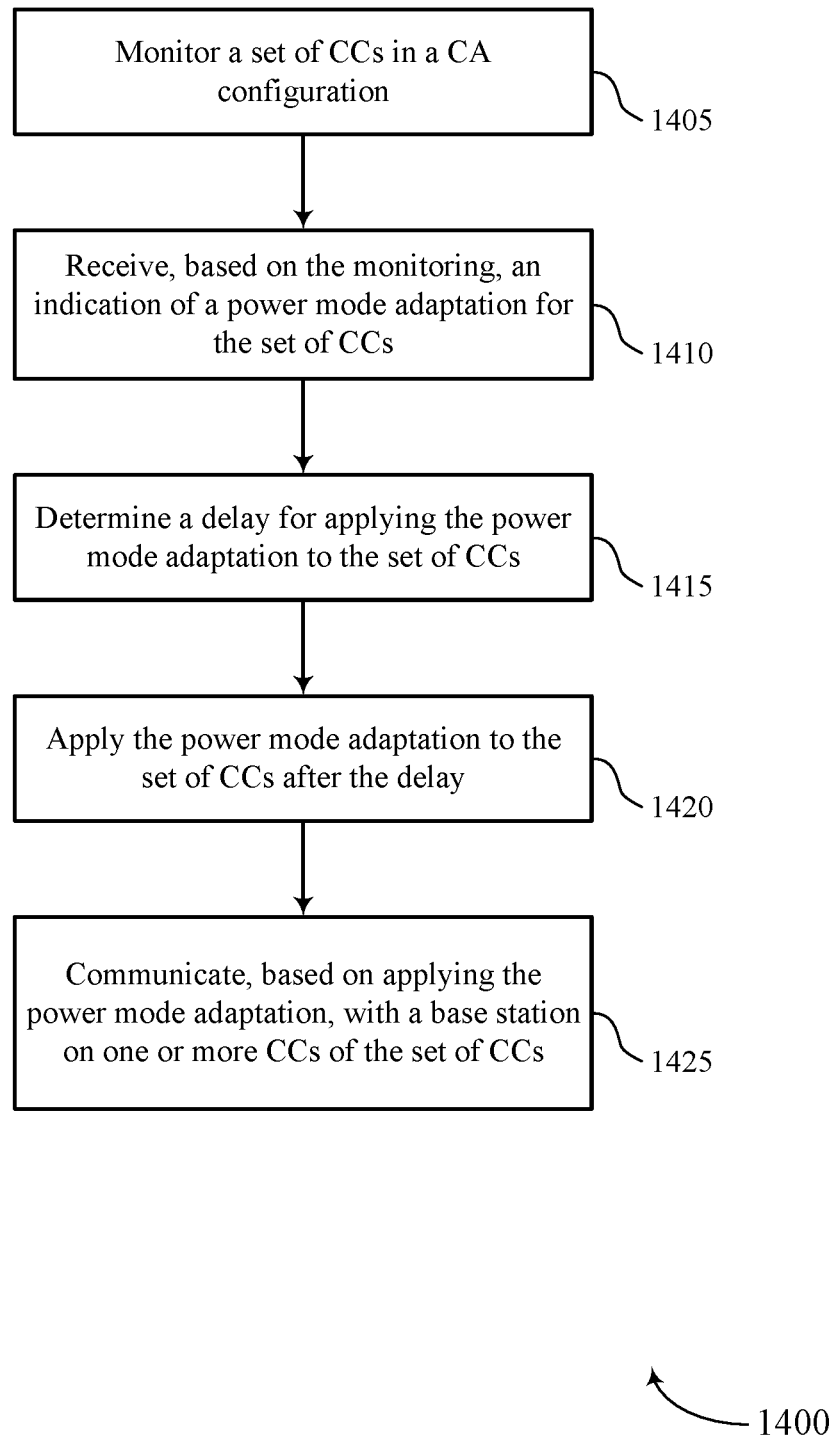
FIGS. 14 through 16 show flowcharts illustrating methods that support application delay for power mode adaptation in accordance with aspects of the present disclosure.

FIG. 14 shows a flowchart illustrating a method 1400 that supports application delay for power mode adaptation in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may monitor a set of CCs in a CA configuration. The operations of 1405 may be performed according to the methods described herein. In some examples, aspects of the operations of 1405 may be performed by a CC monitoring component as described with reference to FIGS. 6 through 9.

At 1410, the UE may receive, based on the monitoring, an indication of a power mode adaptation for the set of CCs. The operations of 1410 may be performed according to the methods described herein. In some examples, aspects of the operations of 1410 may be performed by a power mode indication manager as described with reference to FIGS. 6 through 9.

At 1415, the UE may determine a delay for applying the power mode adaptation to the set of CCs. The operations of 1415 may be performed according to the methods described herein. In some examples, aspects of the operations of 1415 may be performed by an application delay manager as described with reference to FIGS. 6 through 9.

At 1420, the UE may apply the power mode adaptation to the set of CCs after the delay. The operations of 1420 may be performed according to the methods described herein. In some examples, aspects of the operations of 1420 may be performed by a power mode application manager as described with reference to FIGS. 6 through 9.

At 1425, the UE may communicate, based on applying the power mode adaptation, with a base station on one or more CCs of the set of CCs. The operations of 1425 may be performed according to the methods described herein. In some examples, aspects of the operations of 1425 may be performed by a CC communication component as described with reference to FIGS. 6 through 9.

Figure 15:
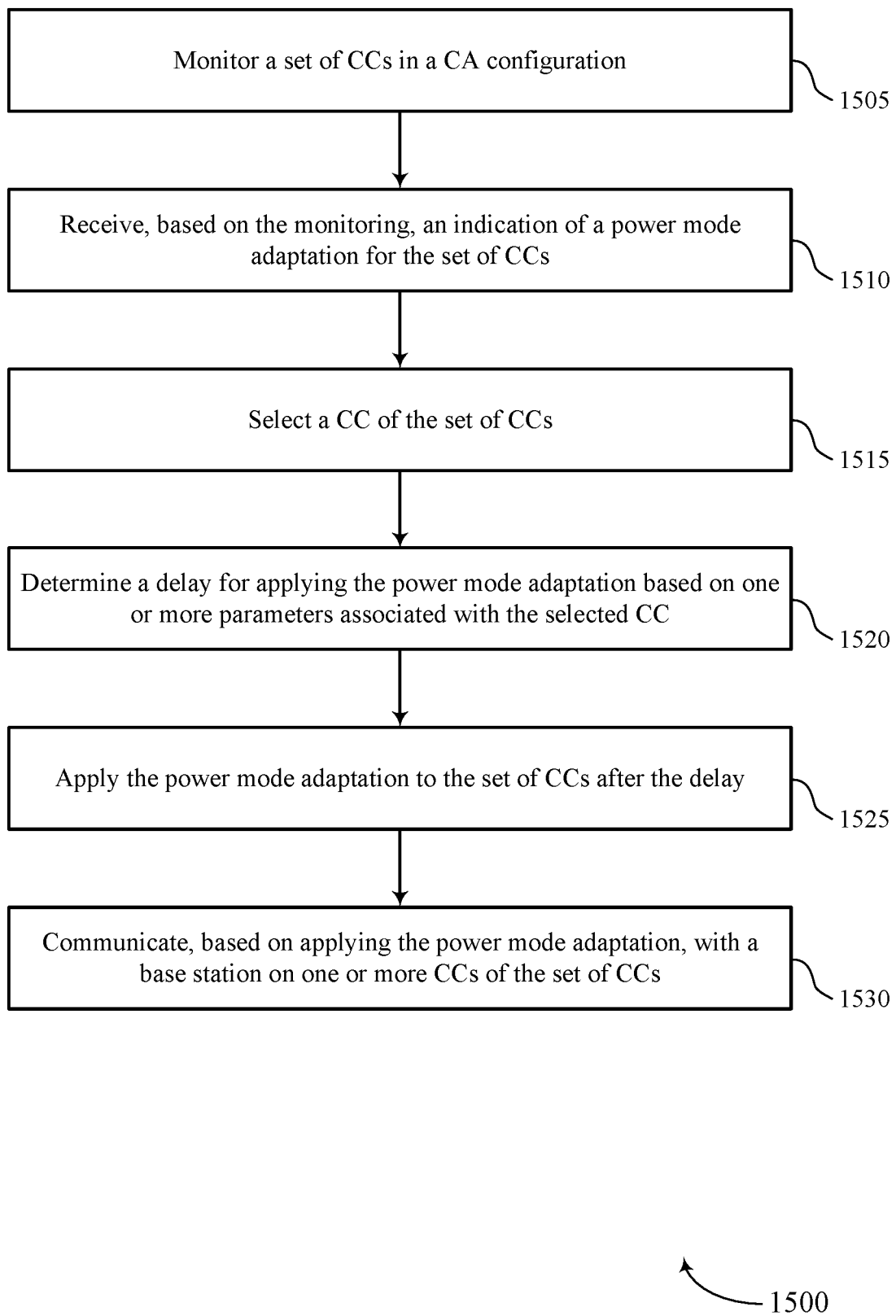

FIG. 15 shows a flowchart illustrating a method 1500 that supports application delay for power mode adaptation in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may monitor a set of CCs in a CA configuration. The operations of 1505 may be performed according to the methods described herein. In some examples, aspects of the operations of 1505 may be performed by a CC monitoring component as described with reference to FIGS. 6 through 9.

At 1510, the UE may receive, based on the monitoring, an indication of a power mode adaptation for the set of CCs. The operations of 1510 may be performed according to the methods described herein. In some examples, aspects of the operations of 1510 may be performed by a power mode indication manager as described with reference to FIGS. 6 through 9.

At 1515, the UE may select a CC of the set of CCs. The operations of 1515 may be performed according to the methods described herein. In some examples, aspects of the operations of 1515 may be performed by a CC selection manager as described with reference to FIGS. 6 through 9.

At 1520, the UE may determine a delay for applying the power mode adaptation based on one or more parameters associated with the selected CC. The operations of 1520 may be performed according to the methods described herein. In some examples, aspects of the operations of 1520 may be performed by an application delay manager as described with reference to FIGS. 6 through 9.

At 1525, the UE may apply the power mode adaptation to the set of CCs after the delay. The operations of 1525 may be performed according to the methods described herein. In some examples, aspects of the operations of 1525 may be performed by a power mode application manager as described with reference to FIGS. 6 through 9.

At 1530, the UE may communicate, based on applying the power mode adaptation, with a base station on one or more CCs of the set of CCs. The operations of 1530 may be performed according to the methods described herein. In some examples, aspects of the operations of 1530 may be performed by a CC communication component as described with reference to FIGS. 6 through 9.

Figure 16:
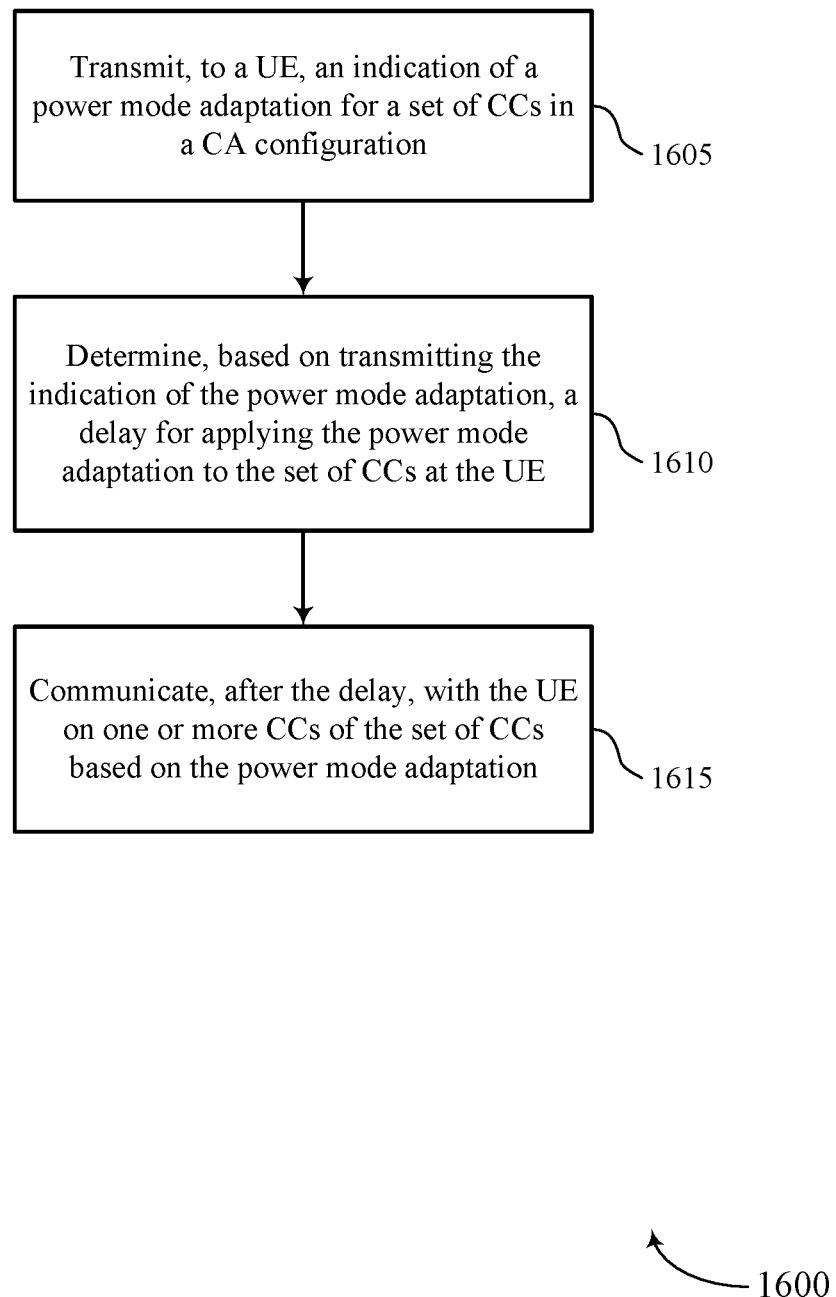

FIG. 16 shows a flowchart illustrating a method 1600 that supports application delay for power mode adaptation in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, an indication of a power mode adaptation for a set of CCs in a CA configuration. The operations of 1605 may be performed according to the methods described herein. In some examples, aspects of the operations of 1605 may be performed by a power mode indication component as described with reference to FIGS. 10 through 13.

At 1610, the base station may determine, based on transmitting the indication of the power mode adaptation, a delay for applying the power mode adaptation to the set of CCs at the UE. The operations of 1610 may be performed according to the methods described herein. In some examples, aspects of the operations of 1610 may be performed by an application delay component as described with reference to FIGS. 10 through 13.

At 1615, the base station may communicate, after the delay, with the UE on one or more CCs of the set of CCs based on the power mode adaptation. The operations of 1615 may be performed according to the methods described herein. In some examples, aspects of the operations of 1615 may be performed by a CC communication manager as described with reference to FIGS. 10 through 13.

The following provides an overview of aspects of the present disclosure:

Aspect 1: A method for wireless communications at a user equipment, comprising: monitoring a plurality of component carriers in a carrier aggregation configuration; receiving, based at least in part on the monitoring, an indication of a power mode adaptation for the plurality of component carriers; determining a delay for applying the power mode adaptation to the plurality of component carriers; applying the power mode adaptation to the plurality of component carriers after the delay; and communicating, based at least in part on applying the power mode adaptation, with a base station on one or more component carriers of the plurality of component carriers.

Aspect 2: The method of aspect 1, wherein applying the power mode adaptation comprises: adjusting, based at least in part on the indication of the power mode adaptation, a downlink scheduling offset, a physical downlink control channel monitoring periodicity, a quantity of downlink communication layers, or any combination thereof.

Aspect 3: The method of any of aspects 1 through 2, further comprising: determining a first quantity of slots associated with the delay for a first component carrier of the plurality of component carriers based at least in part on a first numerology associated with the first component carrier; determining a second quantity of slots associated with the delay for a second component carrier of the plurality of component carriers based at least in part on a second numerology associated with the second component carrier; communicating on the first component carrier based at least in part on applying the power mode adaptation after the first quantity of slots; and communicating on the second component carrier based at least in part on applying the power mode adaptation after the second quantity of slots.

Aspect 4: The method of any of aspects 1 through 3, wherein determining the delay comprises: determining the delay based at least in part on a processing time corresponding to one or more numerologies associated with one or more of the plurality of component carriers, a processing time corresponding to adjusting hardware components at the user equipment, a scheduling offset value associated with downlink transmissions, a current power mode for the plurality of component carriers, one or more numerologies associated with one or more of the plurality of component carriers, or any combination thereof.

Aspect 5: The method of any of aspects 1 through 4, further comprising: identifying a change in an activation status of one or more of the plurality of component carriers; updating the delay for applying the power mode adaptation based at least in part on identifying the change in the activation status; and applying the power mode adaptation to the plurality of component carriers after the updated delay.

Aspect 6: The method of any of aspects 1 through 5, wherein receiving the indication comprises: receiving the indication in downlink control information, radio resource control signaling, a medium access control control element, or any combination thereof.

Aspect 7: The method of any of aspects 1 through 6, wherein determining the delay comprises: selecting a component carrier of the plurality of component carriers; and determining the delay based at least in part on one or more parameters associated with the selected component carrier.

Aspect 8: The method of aspect 7, further comprising: receiving the indication of the power mode adaptation on the selected component carrier.

Aspect 9: The method of any of aspects 7 through 8, wherein the selected component carrier comprises an anchor component carrier or a master component carrier of the plurality of component carriers.

Aspect 10: The method of any of aspects 7 through 9, wherein the selected component carrier has a highest index of the plurality of component carriers.

Aspect 11: The method of any of aspects 7 through 10, wherein the selected component carrier has a lowest index of the plurality of component carriers.

Aspect 12: The method of any of aspects 7 through 11, wherein the selected component carrier has a largest subcarrier spacing of the plurality of component carriers.

Aspect 13: The method of any of aspects 7 through 12, wherein the selected component carrier has a smallest subcarrier spacing of the plurality of component carriers.

Aspect 14: The method of any of aspects 7 through 13, wherein determining the delay further comprises: determining, for each component carrier of the plurality of component carriers, a respective delay for applying the power mode adaptation to the plurality of component carriers based at least in part on the parameters.

Aspect 15: The method of aspect 14, wherein the selected component carrier has a smallest delay of the plurality of component carriers.

Aspect 16: The method of any of aspects 14 through 15, wherein the selected component carrier has a largest delay of the plurality of component carriers.

Aspect 17: A method for wireless communications at a base station, comprising: transmitting, to a user equipment, an indication of a power mode adaptation for a plurality of component carriers in a carrier aggregation configuration; determining, based at least in part on transmitting the indication of the power mode adaptation, a delay for applying the power mode adaptation to the plurality of component carriers at the user equipment; and communicating, after the delay, with the user equipment on one or more component carriers of the plurality of component carriers based at least in part on the power mode adaptation.

Aspect 18: The method of aspect 17, further comprising: refraining from transmitting an indication of a second power mode adaptation for the plurality of component carriers during the delay.

Aspect 19: The method of any of aspects 17 through 18, further comprising: determining a first quantity of slots associated with the delay for a first component carrier of the plurality of component carriers based at least in part on a first numerology associated with the first component carrier; determining a second quantity of slots associated with the delay for a second component carrier of the plurality of component carriers based at least in part on a second numerology associated with the second component carrier; communicating on the first component carrier based at least in part on applying the power mode adaptation after the first quantity of slots; and communicating on the second component carrier based at least in part on applying the power mode adaptation after the second quantity of slots.

Aspect 20: The method of any of aspects 17 through 19, wherein determining the delay comprises: determining the delay based at least in part on a processing time at the user equipment corresponding to one or more numerologies associated with one or more of the plurality of component carriers, a processing time corresponding to adjusting hardware components at the user equipment, a scheduling offset value associated with downlink transmissions, a current power mode at the user equipment for the plurality of component carriers, one or more numerologies associated with one or more of the plurality of component carriers, or any combination thereof.

Aspect 21: The method of any of aspects 17 through 20, further comprising: identifying a change in an activation status of one or more of the plurality of component carriers; updating the delay for applying the power mode adaptation based at least in part on identifying the change in the activation status; and communicating, after the updated delay, with the user equipment on one or more component carriers of the plurality of component carriers based at least in part on the power mode adaptation.

Aspect 22: The method of any of aspects 17 through 21, wherein transmitting the indication comprises: transmitting the indication in downlink control information, radio resource control signaling, a medium access control control element, or any combination thereof.

Aspect 23: The method of any of aspects 17 through 22, wherein determining the delay comprises: identifying a selected component carrier of the plurality of component carriers; and determining the delay based at least in part on one or more parameters associated with the selected component carrier.

Aspect 24: The method of aspect 23, further comprising: transmitting the indication of the power mode adaptation on the selected component carrier.

Aspect 25: An apparatus for wireless communications at a user equipment, comprising a processor; memory coupled with the processor; and instructions stored in the memory and executable by the processor to cause the apparatus to perform a method of any of aspects 1 through 16.

Aspect 26: An apparatus for wireless communications at a user equipment, comprising at least one means for performing a method of any of aspects 1 through 16.

Aspect 27: A non-transitory computer-readable medium storing code for wireless communications at a user equipment, the code comprising instructions executable by a processor to perform a method of any of aspects 1 through 16.

Aspect 28: An apparatus for wireless communications at a base station, comprising a processor; memory coupled with the processor; and instructions stored in the memory and executable by the processor to cause the apparatus to perform a method of any of aspects 17 through 24.

Aspect 29: An apparatus for wireless communications at a base station, comprising at least one means for performing a method of any of aspects 17 through 24.

Aspect 30: A non-transitory computer-readable medium storing code for wireless communications at a base station, the code comprising instructions executable by a processor to perform a method of any of aspects 17 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
    monitoring a plurality of component carriers in a carrier aggregation configuration according to a first common power mode;

receiving, based at least in part on the monitoring, a signal comprising an indication of a second common power mode for the plurality of component carriers; and monitoring, after a delay, the plurality of component carriers according to the second common power mode based at least in part on receiving the indication of the second common power mode.

2. The method of claim 1, further comprising:
receiving an indication of a physical downlink control channel monitoring periodicity, wherein the monitoring periodicity is based at least in part on the second common power mode.

3. The method of claim 1,
wherein, for each component carrier of the plurality of component carriers, the delay comprises a quantity of symbols that is based at least in part on a respective numerology associated with the component carrier.

4. The method of claim 1, wherein
the delay is based at least in part on a processing time corresponding to one or more numerologies associated with one or more of the plurality of component carriers, a processing time corresponding to adjusting hardware components at the UE, a scheduling offset value associated with downlink transmissions, a current power mode for the plurality of component carriers, one or more numerologies associated with one or more of the plurality of component carriers, or any combination thereof.

5. The method of claim 1, further comprising:
updating the delay for applying the second common power mode based at least in part on a change in an activation status of one or more of the plurality of component carriers, wherein the delay is based at least in part on a quantity of active component carriers of the plurality of component carriers; and monitoring the plurality of component carriers according to the second common power mode after the updated delay.

6. The method of claim 1, wherein receiving a signal comprising an indication of a second common power mode comprises:
receiving a downlink control information signal comprising the indication of the second common power mode.

7. The method of claim 1, wherein
the delay is based at least in part on one or more parameters associated with a component carrier selected from the plurality of component carriers.

8. The method of claim 7, wherein receiving a signal comprising an indication of a second common power mode comprises:
receiving an indication of a second common power mode on the selected component carrier.

9. The method of claim 7, wherein the selected component carrier comprises an anchor component carrier or a master component carrier of the plurality of component carriers.

10. The method of claim 7, wherein the selected component carrier has a highest index of the plurality of component carriers.

11. The method of claim 7, wherein the selected component carrier has a lowest index of the plurality of component carriers.

12. The method of claim 7, wherein the selected component carrier has a largest subcarrier spacing of the plurality of component carriers.

13. The method of claim 7, wherein the selected component carrier has a smallest subcarrier spacing of the plurality of component carriers.

14. The method of claim 7, further comprising:
determining, for each component carrier of the plurality of component carriers, a respective delay for applying the second common power mode to the plurality of component carriers based at least in part on the one or more parameters.

15. A user equipment (UE) for wireless communication, comprising:
one or more memories storing processor-executable code; and
one or more processors coupled with the one or more memories and individually or collectively operable to execute the code to cause the UE to:
monitor a plurality of component carriers in a carrier aggregation configuration according to a first common power mode;
receive, based at least in part on the monitoring, a signal comprising an indication of a second common power mode for the plurality of component carriers; and
monitor, after a delay, the plurality of component carriers according to the second common power mode based at least in part on receiving the indication of the second common power mode.

16. The UE of claim 15, wherein the one or more processors are individually or collectively further operable to execute the code to cause the UE to:
receive an indication of a physical downlink control channel monitoring periodicity, wherein the monitoring periodicity is based at least in part on the second common power mode.

17. The UE of claim 15, wherein, for each component carrier of the plurality of component carriers, the delay comprises a quantity of symbols that is based at least in part on a respective numerology associated with the component carrier.

18. The UE of claim 15, wherein the delay is based at least in part on a processing time corresponding to one or more numerologies associated with one or more of the plurality of component carriers, a processing time corresponding to adjusting hardware components at the UE, a scheduling offset value associated with downlink transmissions, a current power mode for the plurality of component carriers, one or more numerologies associated with one or more of the plurality of component carriers, or any combination thereof.

19. The UE of claim 15, wherein the one or more processors are individually or collectively further operable to execute the code to cause the UE to:
update the delay for applying the second common power mode based at least in part on a change in an activation status of one or more of the plurality of component carriers, wherein the delay is based at least in part on a quantity of active component carriers of the plurality of component carriers; and
monitor the plurality of component carriers according to the second common power mode after the updated delay.

20. The UE of claim 19, wherein, to receive a signal comprising an indication of a second common power mode, the one or more processors are individually or collectively operable to execute the code to cause the UE to:
receive a downlink control information signal comprising the indication of the second common power mode.

21. The UE of claim 15, wherein the delay is based at least in part on one or more parameters associated with a component carrier selected from the plurality of component carriers.

22. The UE of claim 21, wherein the selected component carrier has a smallest subcarrier spacing of the plurality of component carriers.

23. The UE of claim 15, wherein the delay comprises a common delay for each component carrier of the plurality of component carriers.

24. The method of claim 1, wherein the delay comprises a common delay for each component carrier of the plurality of component carriers.

25. A non-transitory computer-readable medium storing code for wireless communication, the code comprising instructions executable by one or more processors to:
monitor a plurality of component carriers in a carrier aggregation configuration according to a first common power mode;
receive, based at least in part on the monitoring, a signal comprising an indication of a second common power mode for the plurality of component carriers; and
monitor, after a delay, the plurality of component carriers according to the second common power mode based at least in part on receiving the indication of the second common power mode.

26. The non-transitory computer-readable medium of claim 25, wherein the instructions are further executable by the one or more processors to:
receive an indication of a physical downlink control channel monitoring periodicity, wherein the monitoring periodicity is based at least in part on the second common power mode.

27. The non-transitory computer-readable medium of claim 25, wherein, for each component carrier of the plurality of component carriers, the delay comprises a quantity of symbols that is based at least in part on a respective numerology associated with the component carrier.

28. A UE for wireless communication, comprising:
means for monitoring a plurality of component carriers in a carrier aggregation configuration according to a first common power mode;
means for receiving, based at least in part on the monitoring, a signal comprising an indication of a second common power mode for the plurality of component carriers; and
means for monitoring, after a delay, the plurality of component carriers according to the second common power mode based at least in part on receiving the indication of the second common power mode.

29. The UE of claim 28, further comprising:
means for receiving an indication of a physical downlink control channel monitoring periodicity, wherein the monitoring periodicity is based at least in part on the second common power mode.

30. The UE of claim 28, wherein, for each component carrier of the plurality of component carriers, the delay comprises a quantity of symbols that is based at least in part on a respective numerology associated with the component carrier.

* * * * *